United States Patent
Lorenz et al.

(10) Patent No.: US 6,719,948 B2
(45) Date of Patent: Apr. 13, 2004

(54) TECHNIQUES FOR INFILTRATION OF A POWDER METAL SKELETON BY A SIMILAR ALLOY WITH MELTING POINT DEPRESSED

(75) Inventors: Adam M. Lorenz, Somerville, MA (US); Emanuel M. Sachs, Newton, MA (US); Samuel M. Allen, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/863,073

(22) Filed: May 21, 2001

(65) Prior Publication Data

US 2003/0156963 A1 Aug. 21, 2003

Related U.S. Application Data

(60) Provisional application No. 60/206,066, filed on May 22, 2000.

(51) Int. Cl.[7] .................................................. B22F 3/26
(52) U.S. Cl. ............................................................ 419/27
(58) Field of Search .......................................... 419/27

(56) References Cited

U.S. PATENT DOCUMENTS

| | | |
|---|---|---|
| 3,652,261 A | 3/1972 | Taubenblat |
| 4,286,987 A | 9/1981 | Matthews |
| 4,327,156 A | 4/1982 | Dillon et al. |
| 4,455,354 A | 6/1984 | Dillon et al. |
| 4,478,638 A | 10/1984 | Smith, Jr. et al. |
| 4,710,273 A | 12/1987 | Okamoto |
| 4,964,908 A | 10/1990 | Greetham et al. |
| 4,971,755 A | 11/1990 | Kawano et al. |
| 5,236,032 A | 8/1993 | Nukami et al. |
| 5,509,555 A | 4/1996 | Chiang et al. |
| 5,745,834 A | 4/1998 | Bampton et al. |
| 5,791,397 A | 8/1998 | Suzuoki et al. |
| 5,848,349 A | * 12/1998 | Newkirk et al. .............. 419/10 |

OTHER PUBLICATIONS

Banerjee, S., Oberacker, R., and Goetzel, C., "Experimental Study of Capillary Force Induced Infiltration of Compacted Iron Powders with Cast Iron," Modern Developments in Powder Metallurgy, vol. 16, Metal Powder Industries Federation: Princeton, NJ, pp. 209–244, 1984.

(List continued on next page.)

*Primary Examiner*—Daniel Jenkins
(74) *Attorney, Agent, or Firm*—Steven J. Weissburg

(57) ABSTRACT

In infiltrating a porous metal skeleton an infiltrant composition is used similar to that of the powder skeleton, but with the addition of a melting point depressant. The infiltrant quickly fills the skeleton. As the melting point depressant diffuses into the base powder, the liquid may undergo diffusional solidification and the material eventually homogenizes. Maintaining the infiltrant at a liquidus composition for the infiltration temperature typically ensures that the bulk composition or properties will remain uniform throughout the part, particularly in the direction of infiltration. Success of such an infiltration is enhanced by effective means of maintaining the molten infiltrant at a liquidus composition. It is also beneficial, in some cases, for the time scale of the infiltration to be much faster than the time scale of the diffusion of the melting point depressant and the subsequent solidification and homogenization. The relative rates of infiltration and diffusion/solidification rate are significantly impacted by the choice of materials system. Other factors also influence these rates. They include: selection of powder size (diameter), shape, surface roughness, and size distribution, feeding liquid from different locations, liquid feeder channels, smoothing of the part surface with fine powder and affecting infiltrant fluid properties. Various material systems are also disclosed, as are methods of designing a process of infiltrating a part, including binary and ternary and higher component systems. Homogeneous composition may be achieved using these techniques, particularly along the direction of infiltration.

63 Claims, 18 Drawing Sheets

OTHER PUBLICATIONS

Carman, C., Flow of gases through porous media. Butterworths: London, pp. 8–13, 1956.

Messner, R. and Chiang, Y., "Liquid–Phase Reaction–Bonding of Silicon Carbide Using Alloyed Silicon–Molybdenum Melts," Journal of the American Ceramic Society, vol. 73, No. 5, pp. 1193–1200, 1990.

Scherer, G., "Theory of Drying," Journal of the American Ceramic Society, vol. 73, No. 1, pp. 3–14, 1990.

Sercombe, T., Loretto M., and Wu, X., "The Production of Improved Rapid Tooling Materials, " Advances in Powder Metallurgy and Particulate Materials, pp. 3–25 to 3–36, Proceedings of the 2000 International Conference of Powder Metallurgy and Particulate Materials, May 30–Jun. 3, 2000. Metal Powder Industries Federation: Princeton, NJ.

Tanzilli, R. and Heckel, R., "Numerical Solutions to the Finite, Diffusion–Controlled, Two–Phase, Moving–Interface Problem (with Planar, Cylindrical, and Spherical Interfaces)," Transactions of the Metallurgical Society of AIME, vol. 242, pp. 2313–2321, Nov. 1968.

Thorsen, K., Hansen, S., and Kjaergaard, O., "Infiltration of Sintered Steel with a Near–Eutectic Fe–C–P Alloy," Powder Metallurgy International, Vol 15, No. 2, pp. 91–93, 1983.

Zhuang, H., Chen, J., and Lugscheider, E., "Wide gap brazing of stainless steel with nickel–base brazing alloys," Welding in the World, vol. 24, No. 9/10, pp. 200–208, 1986.

Zhuang, W. and Eagar, T., "Liquid infiltrated powder interlayer bonding: a process for large gap joining," Science and Technology of Welding and Joining, vol. 5, No. 3, pp. 125–135, 2000.

Goetzel, Claus G., "Infiltration," ASM Handbook, vol. 7, Powder Metallurgy, pp. 551–566, 1984.

Landford, George, "High Speed Steel made by Liquid Infiltration," Materials Science and Engineering, 28, pp. 275–284, 1977.

Langford, George and Cunningham, Robert E., "Steel Casting by Diffusion Solidification", Metallurgical Transactions B, vol. 9B, pp. 5–19, Mar. 1978.

\* cited by examiner

*Fig. 2*
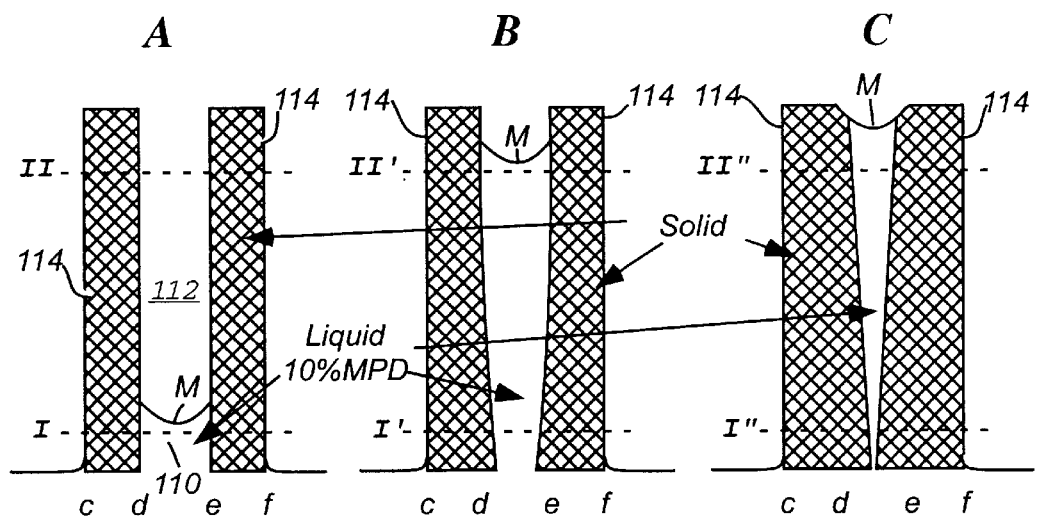
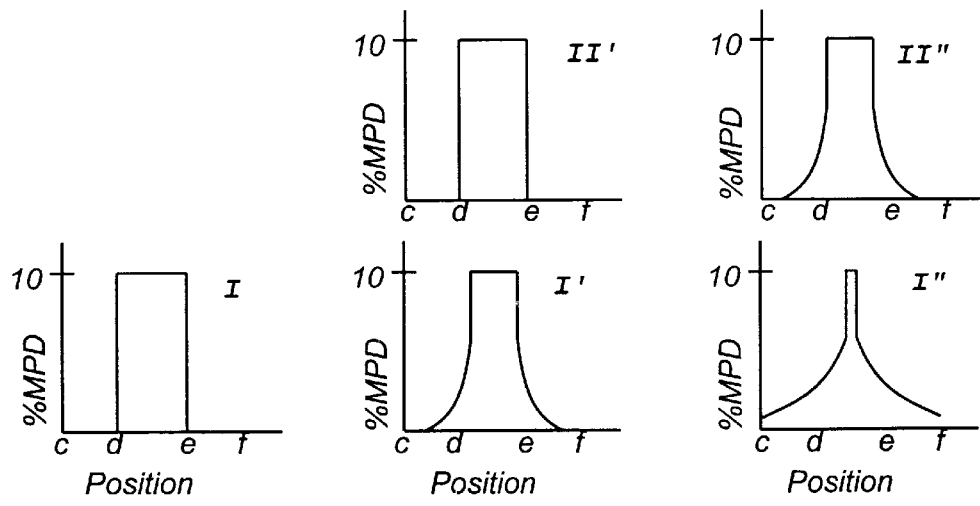
*Fig. 3*

*Al-Si*

TECHNIQUES FOR INFILTRATION OF A POWDER METAL SKELETON BY A SIMILAR ALLOY WITH MELTING POINT DEPRESSED

PRIORITY CLAIM

This claims priority to U.S. Provisional application No. 60/206,066, filed on May 22, 2000, the full disclosure of which is fully incorporated by reference herein.

GOVERNMENT RIGHTS

The United States Government has certain rights in this invention pursuant to the Office of Naval Research Award #N0014-99-1-1090, Research in Manufacturing and Affordability, awarded on Sep. 30, 1999.

The inventions disclosed herein will be understood with regard to the following description, appended claims and accompanying drawings, where:

BRIEF DESCRIPTION OF FIGURES

FIG. 2 shows schematically infiltration of an idealized capillary channel with an infiltrant at liquidus composition and subsequent diffusion and diffusional solidification to achieve uniform final bulk composition;

FIG. 3 shows schematically, the percentage of melting point depressant within the capillary channel and the surrounding skeleton walls of FIG. 2, at the locations along the capillary channel designated I and II, at three different times (unprimed, ', ");

DETAILED DISCUSSION

Figure 1:
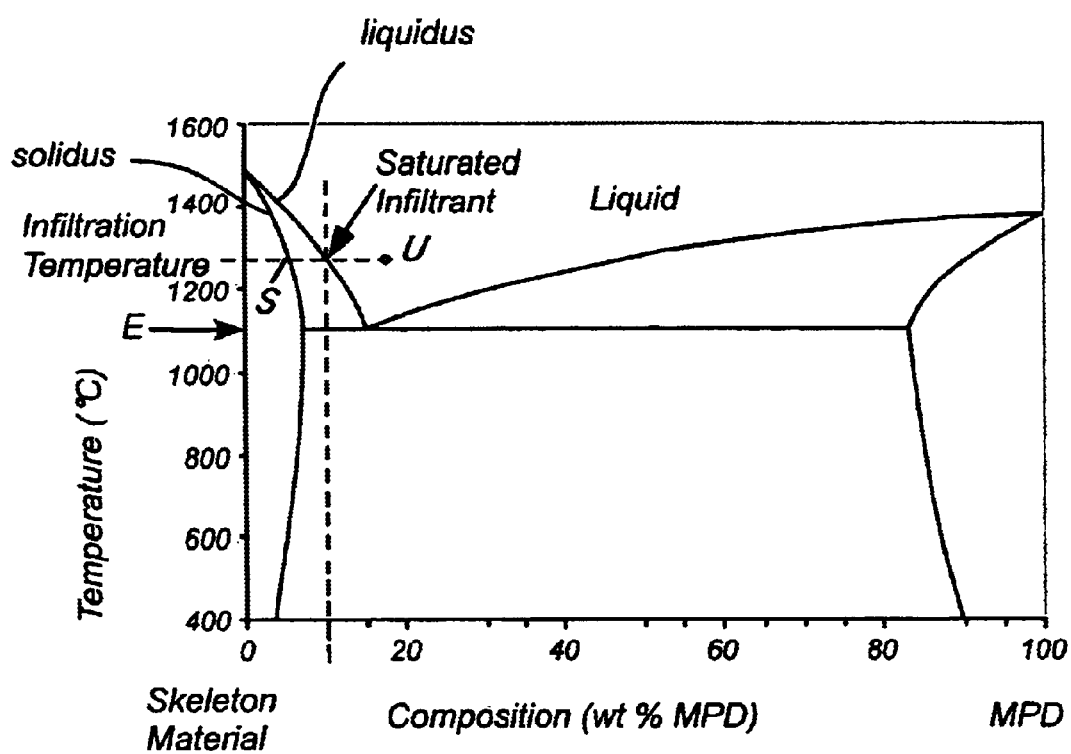
FIG. 1 is a generic equilibrium phase diagram for a mixture of skeleton material and a single element as a melting point depressant.

Traditional manufacturing processes using powder metallurgy ("PM") produce a near net shape part which is only initially 50-70% dense. These 'green' parts then undergo further processing to achieve full density and the desired mechanical properties either through lightly sintering and infiltrating with a lower melting temperature alloy or through a high temperature sintering alone. In the first method, the part's dimensional change is typically only ~1% making it suitable for fairly large (~0.5 m on a side) parts, but the resulting material composition will be a heterogeneous mixture of the powder material and the lower melting temperature infiltrant. In the second method, sintering the powder to full density will result in a homogeneous final material, but a part starting at 60% density will undergo ~15% linear shrinkage. For this reason, full-density sintering is typically only used for smaller (<5 cm on a side) parts.

In some cases, infiltration can be done extremely rapidly by the application of external pressure. However, this requires a mold and typically expensive processing equipment. The inventions disclosed herein are directed to pressureless infiltration, where the primary driving force is capillarity and in some cases, gravity.

In many critical applications (structural, aerospace, military), a material of homogeneous composition (or with homogeneous properties) is preferable because of certification issues, corrosion issues, machinability, or temperature limitations that might be imposed by the lower melting point infiltrant. Further, because designers of metal components are not accustomed to working with composites of heterogeneous composition, they experience a psychological barrier to adoption.

Creation of very large parts with homogeneous composition or properties via powder metallurgy builds on all of the benefits of PM processing. This can be done using an infiltration step to densify the green part without any significant dimensional change, but in such a way that the final material has a homogeneous composition or properties to enable significant advantages over tradition processing. It is also beneficial to ensure the bulk material composition or properties are consistent throughout the entire part. Solid freeform fabrication processes, (such as three-dimensional printing, selective laser sintering, etc.) metal injection molding, or other PM processes will be enabled to make homogeneous net shape parts in a wide variety of sizes by methods described herein. Also disclosed is the potential of matching the final part composition or properties to existing commercial material systems.

By three-dimensional printing, it is meant the processes described generally in U.S. Pat. Nos., 5,204,055, 5,387,380, 5,490,882, 5,775,402, which are incorporated herein by reference.

A general concept, explored more fully below, is to use an infiltrant composition similar to that of the powder skeleton, but with the addition of a melting point depressant. The infiltrant quickly fills the powder skeleton. Then, as the melting point depressant diffuses into the base powder, in some cases, the liquid undergoes diffusional solidification and the material eventually homogenizes. The diffusional solidification may be isothermal, but need not be. Maintaining the infiltrant at a liquidus composition for the infiltration temperature typically ensures that the bulk composition or properties will remain uniform throughout the part, particularly in the direction of infiltration.

Success of such an infiltration is enhanced by effective means of maintaining the molten infiltrant at a liquidus composition. It is also beneficial, in some cases, for the time scale of the infiltration to be much faster than the time scale of the diffusion of the melting point depressant and the subsequent solidification and homogenization. Methods of establishing the liquidus composition include all of the following or a combination of any of these: separating the infiltrant melt supply from the skeleton prior to infiltration, adding excess skeleton material to the melt, overshooting the infiltration temperature, and agitating the melt. The relative rates of infiltration and diffusion/solidification rate are significantly impacted by the choice of materials system. But other techniques have been developed, and are disclosed herein, to influence these rates. They include: selection of powder size (diameter), shape, surface roughness, and size distribution, feeding liquid from different locations, liquid feeder channels, smoothing of the part surface with fine powder and affecting the infiltrant fluid properties.

In some cases, even after the part has reached its equilibrium condition at the infiltration temperature, some of the infiltrant in the skeleton will remain liquid after diffusional solidification has ceased. In some such circumstances, the final microstructure that results is not homogeneous, but rather is similar to that typically obtained with a cast part, which is also a useful result.

Because significant mass transport occurs in parts after infiltration has occurred, there exists the potential for very small voids to develop within the part due to differential movement of species. These voids are generally referred to as Kirkendall porosity, and may appear to varying degrees based on factors such as the mechanism of diffusion and the relative size of mobile species. This porosity is typically very fine scale and may not affect mechanical properties. Heat treatment, including hot isostatic pressing, can be used to reduce these voids in the event they are significant.

Infiltrant with Single Element as Melting Point Depressant

The initial discussion is limited to the important case of an infiltrant composed of the skeleton material with the addition of a single element from the Periodic Table to serve as a Melting Point Depressant (MPD). In this case, it is generally possible to design the infiltrant composition and the infiltration temperature in such a manner as to guarantee that the infiltrated body is uniform in bulk composition, that is, that there is no gradient in bulk composition along the path of infiltration.

A Melting Point Depressant (MPD) is a material which, when added to a metal, produces a new alloy which melts at a lower temperature than the metal itself. The MPD typically is composed of a single element, however, multiple elements are also possible. The metal itself may be a single element, however, alloys composed of two or more elements are most common. Alloys typically have temperature ranges over which they melt and not just a single melting temperature. An alloy begins to melt at the solidus temperature and becomes fully molten at the liquidus temperature. The addition of an MPD to a metal produces a new alloy with a lower liquidus temperature (temperature at which the alloy is fully molten) than the liquidus temperature of the metal itself. (In the case of the addition of an MPD to a metal composed of a single element, the liquidus temperature of the alloy is lower than the melting temperature of the elemental metal.) In a preferred embodiment of some of the inventions disclosed herein, the MPD will result in an alloy whose liquidus temperature is below the solidus temperature of the original metal of a skeleton. In this way, the infiltrant alloy formed of the metal with MPD added can be fully molten while the metal is still fully solid and thus infiltration can take place without the skeleton beginning to melt.

In a binary system there are only two elements present in the skeleton and infiltrant. In the simplest case, the skeleton is composed entirely of a single element and the infiltrant is composed of this element with the addition of a second element as a melting point depressant. However, the same principles apply if the skeleton started with some of the MPD in it and the infiltrant simply has a higher concentration of this MPD.

An equilibrium phase diagram for a generic mixture of a skeleton material and a melting point depressant (MPD) is shown in FIG. 1. The infiltration temperature can be chosen anywhere between the eutectic temperature (~1100° C.) and melting temperature of the skeleton (~1440° C.). If the skeleton is a pure metal, such as nickel, it will have a discrete melting temperature. If, however, it is an alloy containing two or more elements, discussed more below, there is a range of temperatures over which different components of the skeleton begin to melt. The lower limit of this temperature range is the solidus temperature of the skeleton, the maximum temperature at which no liquid is present. Since there is always some variation in processing temperature, the infiltration temperature should remain safely below the solidus temperature of the skeleton.

The skeleton will also be prone to sinter and start to sag as it loses strength near its melting point, discussed below. As long as the skeleton maintains dimensional stability, the infiltration temperature can also be selected to influence the diffusivity and solubility of the MPD in the skeleton material. Generally, the diffusivity increases and solubility decreases with increasing processing temperature. These tendencies are relevant to the challenge of ensuring that the entire skeleton fills with liquid before solidification chokes off the liquid flow, discussed in more detail below.

It is helpful to now consider the case where the composition of the infiltrant liquid at the infiltration temperature lies along the liquidus of FIG. 1. More specifically, consider the case of infiltration at temperature T and liquidus composition C. At the infiltration temperature shown (~1300° C.), the infiltrant would be liquid at any composition between 10% and 50% MPD. The minimum composition that allows the material to remain completely liquid is 10% MPD—the liquidus composition at the designated temperature. Liquid infiltrant at this composition is considered saturated with the skeleton material, for a binary system. Any removal of MPD from the infiltrant at this temperature will result in solidification of some of the infiltrant at the corresponding solidus composition at point S. Such removal of MPD will typically take place during the infiltration of the skeleton by diffusion of MPD into the skeleton. Thus, as the MPD diffuses into the skeleton, the infiltrant will solidify on the skeleton at the solidus composition and the remaining liquid will still be at the liquidus composition—unchanged by the process of infiltration. Thus the infiltrant flowing through the part will always be at the liquidus composition and the bulk composition throughout the part will be ensured to be uniform.

Reference to FIGS. 2 and 3 further illustrates this concept. FIG. 2 shows schematically a saturated melt 110 at a liquidus composition filling a capillary channel 112. The capillary channel 112 is formed between two identical sheets 114 of skeleton material with spacing and void fraction chosen so that the volume fraction of solid to void space is 60:40. FIG. 2 shows three different moments in time, with the left most (unprimed) being the earliest and the right most (double prime ") being the latest. FIG. 3 shows the expected MPD concentration profile for two locations at the three moments in time. The vertical axis shows the local composition (percent of MPD) as a function of the position on the horizontal axis, with the coordinates c, d, e and f, representing corresponding locations of the sheets of skeleton material and capillary channel shown in FIG. 2. Profile I in FIG. 3 represents the initial condition, when and where the liquid first comes into contact with the skeleton. This profile is found just below the meniscus M as the liquid is flowing up the capillary 112 indicated at I in FIG. 2. At a slightly later time shown in the middle, an identical condition would be found further along the capillary at position II'. The composition profile is 10% MPD in the liquid region and near zero in the solid 114, since the MPD has just begun to diffuse into the solid 114 at the interface. At the position marked as I', the liquid has been in contact with the skeleton for a given time period and diffusion has caused some degree of solidification of the infiltrant. The composition profile labeled I' in FIG. 3 corresponds to the cross-section at the position I' in FIG. 2, with an increased MPD composition in the solid and resulting motion of the solid/liquid interface inward (from d away from c and from e away from f). The right most image of FIG. 2 portrays the capillary 112 after the liquid 110 has reached the top of the capillary channel 114, and the system has had additional time to equilibrate. Since the composition of all of the liquid remains constant regardless of whether the liquid is flowing or not, the solidification behavior and the profile corresponding to the cross-section at position II" will be identical to I'. Similarly, point II" at a future moment in time will be identical to the current profile of I'. After the entire system reaches equilibrium, the composition profile at I (lower position) and II (upper position) will be identical and the final bulk composition throughout the capillary will be uniform.

In contrast, in the case of a liquid infiltrant which has a concentration of MPD above that of the liquidus composition, (such as corresponding to the composition for the point indicated at U, FIG. 1), mass transport of both the skeleton material and the MPD has the potential to change the infiltrant composition. If this happens while the liquid is still flowing into the skeleton, the last areas of the skeleton to be reached by the liquid will have a different final composition of MPD than the first areas reached. Such a variation in bulk composition throughout the part could not be rectified by a homogenizing heat treatment in a reasonable time.

To visualize this concept, consider another similar idealized capillary channel made by two identical sheets of skeleton material with spacing chosen so that the volume fraction of solid to void space is 60:40. Filling the void space within the control volume with an infiltrant composed of 15% MPD would result in an average bulk composition of 6% MPD. For the phase diagram shown in FIG. 1, the infiltrant would be unsaturated (off the liquidus) at the infiltration temperature. The infiltrant would exchange mass with the skeleton material upon contact at its entry point, until reaching its equilibrium liquidus composition of 10% MPD. For the case of a capillary being filled from the bottom, this could occur while the liquid is flowing through the capillary such that the bulk composition at the top would be only 4% MPD, due to MPD depletion. At the bottom (the entry point), the bulk composition would be greater than 6% MPD because of the loss of skeleton material and subsequent replacement with infiltrant having a composition of 15% MPD. Such a variation of bulk composition would result in undesirable variation of properties throughout an infiltrated part. In simple terms, this is the result of lower sections of a part skeleton being dissolved into the liquid and then carried by the liquid to other regions of a part. (If infiltrant enters the part from its top rather than its bottom, such as by simply placing a slug of infiltrant supply material on top of a skeleton and heating it, then the top regions would have a higher contribution based on the MPD. Basically, the region adjacent the infiltrant supply will have increased contribution to composition from MPD.) The case of ternary and higher compositions is similar, with an important added consideration. It is still true that the infiltrant should be designed and controlled to be at a liquidus composition for the chosen temperature of infiltration (see subsequent discussion on erosion). It is further true that the removal (by diffusion) of any of the MPD will result in solidification of material at a solidus composition. However, in the case of a ternary system, for example, at a single temperature there are a range of possible liquidus compositions and a range of possible solidus compositions (as opposed to just a single liquidus and a single solidus composition in the binary case).

Figure 18:
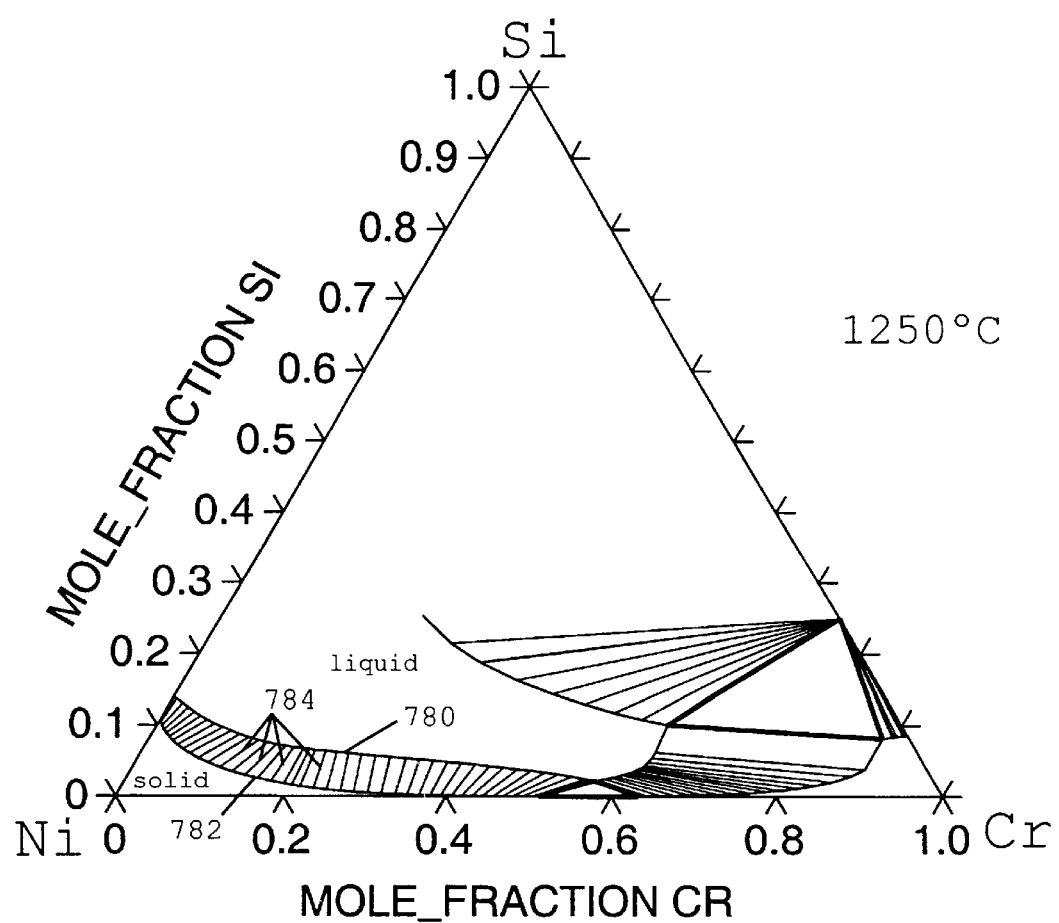
FIG. 18 is a ternary nickel-silicon-chromium equilibrium phase diagram at 1250° C.

FIG. 18 shows a ternary phase diagram for the system consisting of nickel, chromium and silicon at a temperature of 1250° C. (This and all subsequent ternary phase diagrams were generated using Thermo-calc, a Computational Thermodynamics program used to perform calculations of thermodynamic properties of multi-component systems based on the Kaufman binary thermodynamic database.) Line 780 is the liquidus (at this temperature) and any composition falling along this line is a liquidus composition. Line 782 is the solidus and any composition falling along this line is a solidus composition. Further, tie lines 784 connect specific liquidus and solidus compositions. The liquidus and solidus compositions at the end of each tie line can co-exist in two-phase equilibrium.

To ensure that the infiltrated part does not develop a composition gradient along the path of infiltration due to diffusional solidification during infiltration, the liquid infiltrant must solidify with no change in the relative contributions to the infiltrant composition of the non-MPD elements.

Figure 19:
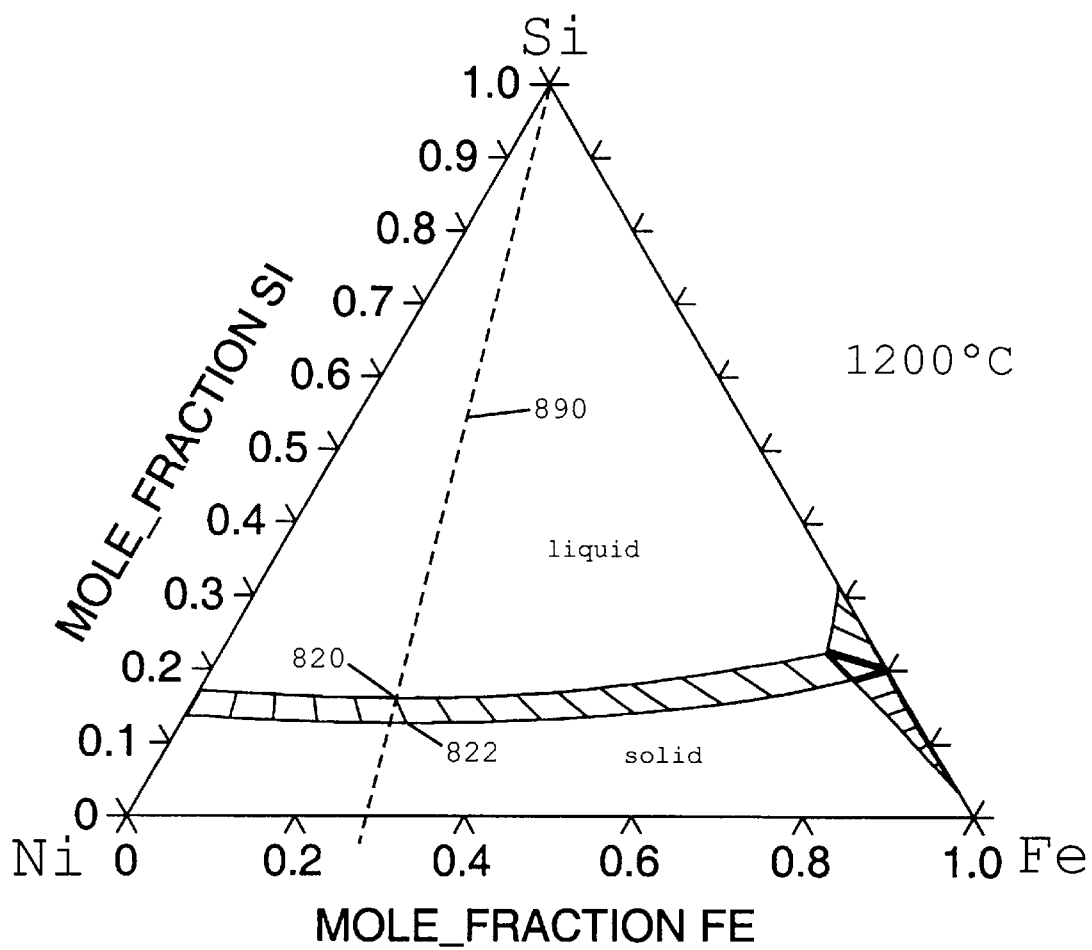
FIG. 19 is a ternary nickel-silicon-iron equilibrium phase diagram at 1200° C., and shows schematically how the relative proportions of nickel and iron change during diffusional solidification.

To illustrate, consider the general case where an infiltrated part would develop a gradient in bulk composition due to diffusional solidification—shown schematically in FIG. 19 using the ternary phase diagram for the system consisting of nickel, iron, and silicon at a temperature of 1200° C. In this case, line 890, which passes through the corner of the diagram corresponding to pure Si, corresponds to compositions that have a constant ratio of Ni and Fe (approximately 72:28). There are other lines of constant ratio, which represent different ratios. A liquidus composition marked 820 is on the line. The solidus composition marked 822 that is connected to the liquidus by a tie line, is not on the line. Thus, the solidus composition has a different ratio of Fe to Ni than does the liquidus composition. In such a case, if the infiltrant begins at a liquidus composition such as 820, diffusional solidification of the infiltrant will result in the remaining liquid becoming relatively richer in Ni (and poorer in Fe). This Ni enriched infiltrant will travel up the skeleton, resulting in the further reaches of the infiltrated part having a higher composition of Ni than the first areas to infiltrate. This is somewhat undesirable.

Figure 20:
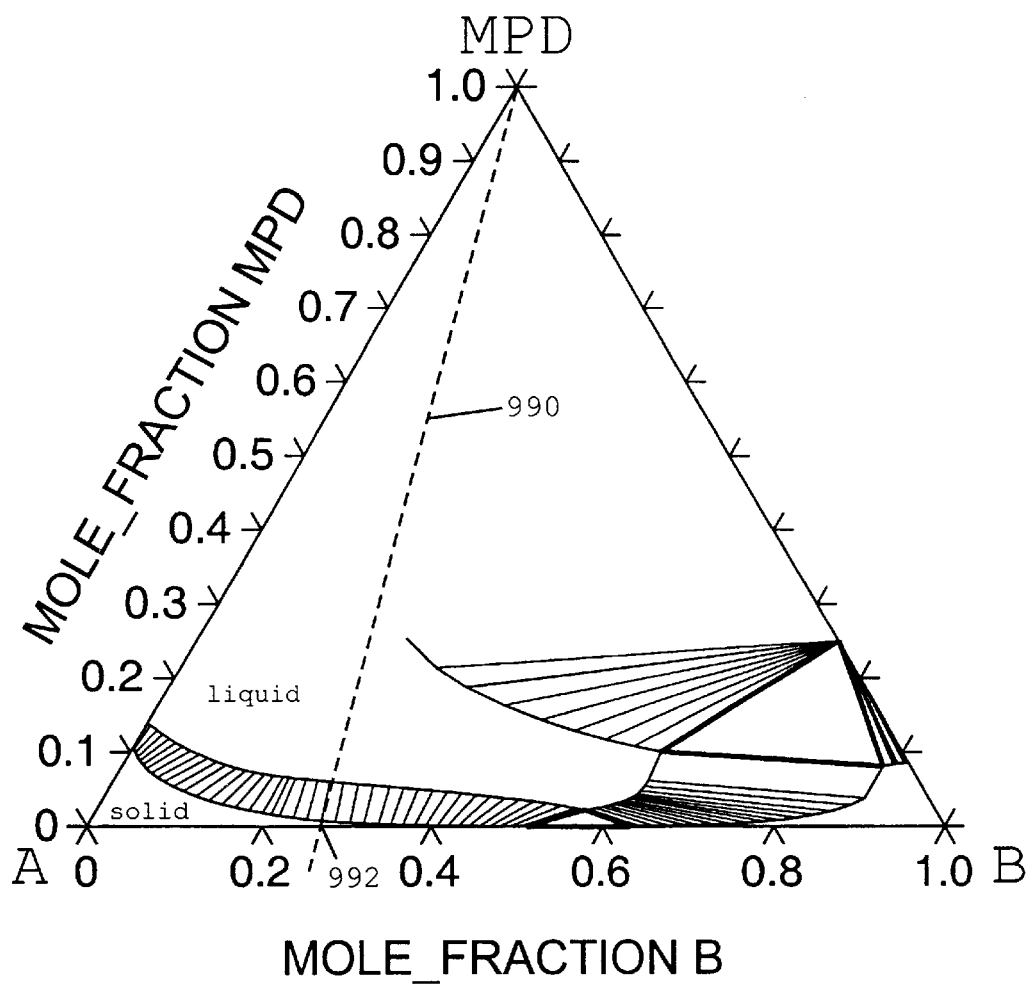
FIG. 20 is a generic ternary equilibrium phase diagram, and shows schematically desirable characteristics to achieve uniform final bulk composition.

The desirable circumstance is best illustrated by reference to FIG. 20, a ternary phase diagram identical to FIG. 18 with the elements labeled A, B and MPD to represent a generic system. In this case, line 990, which passes through the corner of the diagram corresponding to pure MPD, corresponds to compositions that have a constant ratio of A and B, the non MPD components of the infiltrant. The desirable case then is an infiltrant liquidus composition whose tie line lies along this line, as shown. In this case, the liquidus and solidus that are in equilibrium with each other have the same relative concentration of A and B and diffusional solidification will not result in a change in the relative composition of A and B. This will guarantee that there is no variation of composition along the path of infiltration. Not all material systems and infiltration conditions will allow for this condition. Rather, the material system, liquidus composition (infiltrant composition) and infiltration temperature must be chosen by these criteria.

In the most desirable circumstance, the tie line lies along a line of constant relative proportions of A and B as above, and the composition of the skeleton also lies on this same line of constant relative proportions of A and B. In the case of FIG. 20, the skeleton material composition could be chosen at point 992. Thus, as the infiltrant undergoes diffusional solidification, the solidified infiltrant has the same relative proportions of A and B as the skeleton and this will be true along the entire path of the infiltrant. Thus, there will be no need to wait for diffusion of either or both species A and/or B between the skeleton and solidified infiltrant in order to attain uniform composition between them.

In the case of ternary and higher alloys, not all materials systems will allow for the selection of infiltrant alloy such that the tie line is along a line of constant relative proportions of A and B. Further, the added desirable feature of having the skeleton composition lie on this same line of constant relative proportions is more restrictive.

Thus, an aspect of one of the current inventions is to select and design materials systems according to the criteria described. This includes the selection of the elements in the skeleton, the selection of the MPD, the selection of the relative amounts of the non-MPD elements in both the skeleton and in the infiltrant (if different), and the selection of the infiltration temperature. The most preferred case is that the tie line lies along a line of constant relative composition of non-MPD elements and that the skeleton composition lies on this same line. However, having the tie line lie on this line with the skeleton composition not lying on this line is sufficient to guarantee uniform composition along the infiltration path. Uniform composition between infiltrant and skeleton might then be attained by diffusional homogenization. Note that a change in the infiltration temperature will change the orientation of the tie lines and so, the selection of infiltration temperature must also be based on this consideration.

The principles explained herein in the context of the ternary phase diagram also apply to systems with four or more alloying elements. In particular, a system is to be chosen such that, during diffusional solidification, the relative ratio of the non-MPD elements remains substantially constant and, preferably that this ratio is substantially the same in the skeleton as in the infiltrant.

Methods of Ensuring a Liquidus Composition (Saturation)

If the infiltrant composition is known exactly, the process temperature can be selected to exactly match the liquidus temperature for that composition, but this requires very accurate process control. A more robust method for ensuring that the liquid lies at an appropriate liquidus composition, is to put the liquid in contact with sacrificial excess solid skeleton material and allow it to reach an equilibrium liquidus composition corresponding to the actual processing temperature. Having a high interfacial surface area between the liquid and solid can help promote mass transport and speed the process of equilibration. For this reason, it is beneficial if the excess solid material is supplied in powder form, which has large surface area, but this alone may not suffice to guarantee reaching the liquidus composition in reasonable times. In the case of a binary system, as explained above, the liquidus composition is also referred to as a composition saturated with skeleton material.

If raising the MPD concentration lowers the liquid density (which is typically the case), the liquid will stratify with the higher density liquid of low MPD concentration in contact with the solid at the crucible bottom. The liquid of higher MPD concentration will remain at the surface with no mixing by natural convection. Stirring the melt or using some other means of agitation to force convection promotes mixing. A ceramic propeller has been used to stir the infiltrant supply by running a shaft through the furnace roof with a Teflon seal a small motor to power the propeller. Other possible mechanical stirring methods that may be used include tipping the crucible back and forth, flowing the liquid through a sacrificial porous network of skeleton material, shaking, vibrating or sonicating the melt, or bubbling gas through the melt. Placing the liquid in an inductive AC electromagnetic field can also generate substantial mixing by inducing currents in the molten metal. Heating the infiltrant supply by induction is one means for preparing a well-mixed liquid at the equilibrium liquidus temperature. (As used herein, "infiltrant" typically means liquid material that actually infiltrates a skeleton. "Infiltrant supply" means the source material that will melt to become the infiltrant. The infiltrant source material becomes liquid infiltrant plus residual solid at the infiltration temperature; liquid infiltrant is what is available to enter the skeleton.)

Another method to help ensure the liquid is at its liquidus composition is overshooting the infiltration temperature to dissolve excess solid skeleton material that has deliberately been added to the melt. Once the excess material is dissolved, the temperature is slowly ramped back down to the infiltration temperature while agitating the melt. This promotes re-solidification of material, with the remaining liquid at the desired liquidus composition. As long as the liquid is in contact with some solid, it is unlikely that any under-cooling would occur.

Figure 7A:
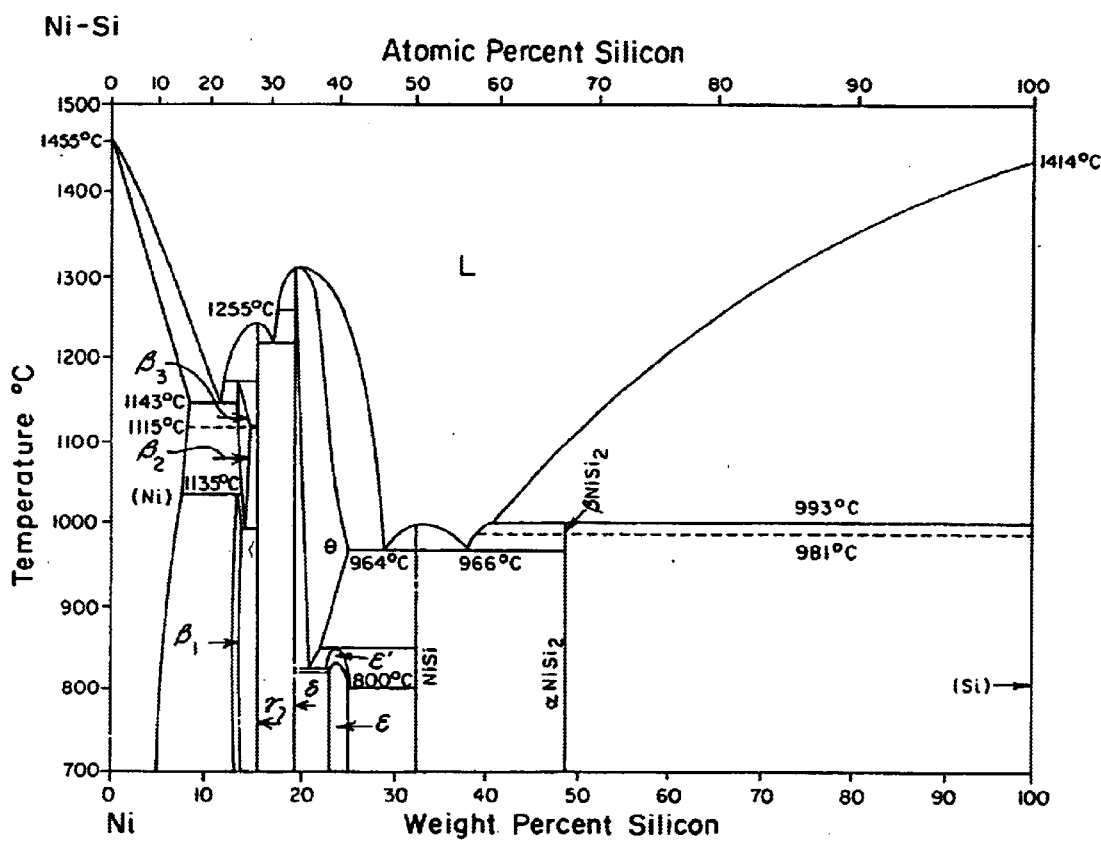
FIG. 7A is a nickel-silicon equilibrium phase diagram.
Figure 7B:
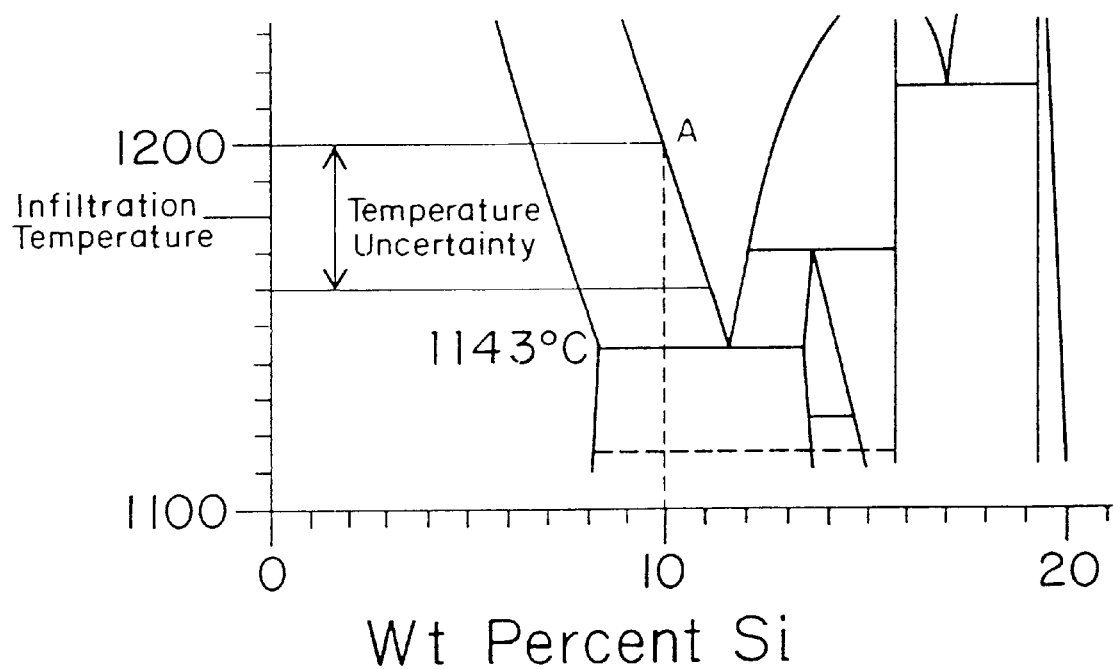
FIG. 7B is an enlargement of a portion of the Ni—Si equilibrium phase diagram of FIG. 7A, which shows schematically an infiltrant at liquidus composition within a processing window, using the nickel-silicon binary system as an example.

The amount of excess skeleton material added to the melt must be sufficient to saturate the melt, but not so much that the melt solidifies. The proper amount is a function of the skeleton material's solubility (maximum capacity to absorb MPD). For example, with a nickel-silicon infiltrant, sacrificial excess nickel powder is added to the crucible of infiltrant. The appropriate amount is determined by considering the extreme cases for a range of processing temperatures. FIG. 7A shows an equilibrium phase diagram for nickel and silicon, and FIG. 7B shows an enlargement of a portion of FIG. 7A. FIG. 7B illustrates how this would be done for a desired infiltration temperature of 1180° C. and maximum temperature variation (due to uncertainties) of plus or minus 20° C. Above and to the right of the liquidus, all compositions are liquid. Below and to the left of the solidus, all compositions are solid. Between, there are compositions that have two coexisting phases, liquid and solid. The bulk composition of infiltrant supply is chosen from the intersection of the maximum anticipated temperature (in this case 1200° C.) with the liquidus line, marked as A on FIG. 7B (in this case, 10% Si and 90% Ni). This ensures that some solid will be present at any temperature below this expected maximum temperature and all of the liquid present will be saturated with nickel and be at the liquidus composition for that temperature. If the temperature is at the lower limit, the total amount of the material provided as the infiltrant supply will be partially liquid and partially solid, in a two-phase field between the liquidus and the solidus. The ratio of liquid to solid will be given by the lever rule. For this example, at 10% Si and 1160° C., it would be approximately 30% solid. This will determine the total quantity of infiltrant supply needed, since only 70% of the infiltrant supply is guaranteed to be liquid infiltrant available for filling the part in this example.

For the case of ternary or higher alloys, there can be a range of liquidus compositions at a given temperature. The infiltrant supply composition can be selected such that it contains the elements of the skeleton material in a relative ratio similar to their elemental composition in the skeleton material alone. Once again, the bulk infiltrant supply composition can be selected to lie in the two-phase region between the solid and liquid at the infiltration temperature, such that any liquid present will be at a liquidus composition. As described previously in FIG. 19, the solidus and liquidus compositions corresponding to a given tie line may have different relative proportions of the elements of the skeleton material. Solidification due to diffusion of MPD may result in depletion or enrichment of other species in the liquid, but this would only result in the liquid moving to a different liquidus composition. The new liquidus composition would still not allow dissolution of any skeleton material. Any enrichment or depletion of the solidifying composition would come from the changing liquid composition rather than the existing skeleton material.

Erosion

Figure 4:
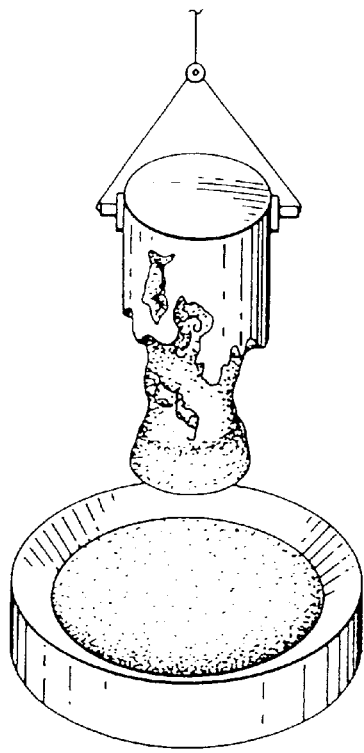
FIG. 4 shows schematically dissolution of a pure nickel skeleton after dipping into an undersaturated (off liquidus) pool of Ni-11 wt % Si infiltrant for 5 minutes at 1200° C.

As mentioned above, if the liquid infiltrant has a composition that is not saturated in the skeleton material, in other words, where the concentration of the MPD is greater than in the equilibrium liquidus composition for a given temperature, the liquid infiltrant will have the capacity to absorb additional material from the skeleton and partially dissolve the skeleton. This can happen very quickly, because of high diffusivity in liquids and can be a significant problem, especially when a large melt pool is used. FIG. 4 shows a pure nickel skeleton, originally a cylinder, with its bottom section dissolved. It was dipped into a pool of molten Ni-11 wt % Si for 5 minutes at 1200° C. Since the equilibrium liquidus composition has significantly less than 11 wt % Si at that temperature, the pool of liquid absorbs the solid nickel as it contacts the skeleton.

Figure 5:
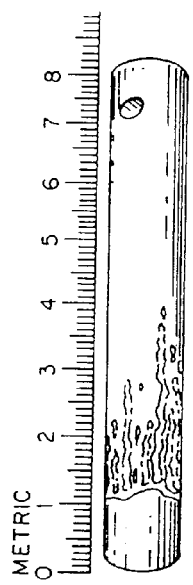
FIG. 5 shows schematically erosion at the base of a cylindrical skeleton, which also progresses several centimeters into the part.

To a lesser degree, a liquid infiltrant not already at its equilibrium liquidus composition has a tendency to leave an erosion path as it enters the skeleton. This occurs to some extent in most powder metal infiltrations, but usually is limited to the initial 1 cm at the base of a part. In such cases, the part to be infiltrated can be placed on a sacrificial stilt. In the nickel-silicon system with an unsaturated infiltrant containing more than the liquidus silicon concentration, the erosion tends to propagate for several centimeters into the part and resembles a riverbed (one example is shown in FIG. 5). This part is approximately 10 cm. long. It was infiltrated from the end near to the zero of the scale, the bottom of FIG. 5, as shown. Studying the erosion pattern on several different shaped parts suggests that erosion occurs in the areas of highest liquid flow. Once erosion begins, a larger channel is created, which has less viscous drag and allows even more liquid to flow through the newly formed channel. An instability such as this explains why the erosion progresses so far into the part (almost 4 cm.). Through metallographic study of cross sections, the eroded areas are found to be high in silicon content. This is not surprising, since those compositions would be liquid at the infiltration temperature. The areas of erosion are not limited to the surface. Voids have been found within the interior of a part in a region of high silicon content.

Using a liquid infiltrant that is at its equilibrium liquidus composition before it contacts the skeleton removes the driving force for diffusion and has proved to be a good method of preventing erosion. Since temperature affects both the diffusion rate and the infiltrant liquidus composition, temperature variation with time or a temperature gradient set up within the part, could be used as a further method of erosion prevention.

Infiltrant with Multiple Elements used to Depress Melting Point

Two or more elements can be used as a melting point depressant. In that case, the mass transport can become more complicated and having a liquidus composition no longer provides a guarantee of uniform bulk composition throughout the part. The diffusivity and solubility in the skeleton material of the various MPD elements will determine their mass transport during the infiltration. If the elements behave similarly to each other, the bulk composition would likely become uniform for the same reasons discussed in the previous section. However, significant diffusion of one element without the other, while the liquid is still flowing, would likely result in variation of final bulk composition. This is the more typical situation. For example, if a second element has significantly lower solubility in the skeleton material, less of that element will be absorbed in the solidifying material and the remaining liquid will be enriched in that second element. This enriched liquid would be carried to other regions of the part, while a fresh supply of infiltrant at the original composition replaces it.

In these cases of multiple elements having different mass transport properties, uniform bulk composition can be achieved by filling the part with liquid in a much shorter time scale than the time scale of diffusion and solidification. Factors that influence the rate of filling and of diffusion are discussed below.

Relative Rates of Infiltration and Diffusion

Figure 6:
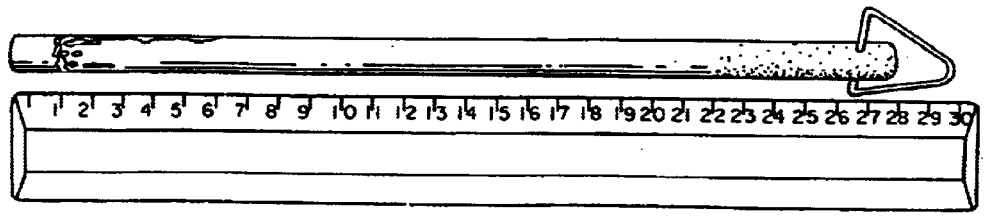
FIG. 6 shows schematically a skeleton composed of ~300 micron powder infiltrated to a height of about 22 centimeters before freezing choked off the flow of infiltrant.

Due to the diffusion of MPD into the skeleton and corresponding infiltrant solidification, in many cases the liquid has only a limited time to fill the part skeleton before the flow is choked off by solidification. In addition, fast infiltration relative to diffusion may be necessary to ensure uniform bulk composition as mentioned above for cases with multiple elements diffusing. The rate of infiltration is determined by various factors, including: the surface tension, wetting angle, viscosity, and density of the liquid infiltrant as well as the geometry of the skeleton, determined by powder size and shape, size distribution, packing density and part geometry. Specific relations are provided below in the discussion of each topic. FIG. 6 shows a Ni—Si skeleton which has been infiltrated to a height of 22 cm by controlling the relative rates of infiltration and diffusion such that diffusion had not proceeded to the point of choke off before the infiltrant reached 22 cm.

Some typical infiltration rates have been measured of the Ni-10 wt % Si infiltrant, filling a skeleton of 50–150 micron nickel powder. This was done by hanging the skeleton from a wire through the roof of the furnace and measuring the force on the wire. By compensating for the surface tension and buoyancy forces, it was possible to relate the force to the increasing mass of the part due to the addition of liquid. The liquid filled an 8 cm tall skeleton in approximately one minute. Other liquid metals have similar viscosity and surface tension so this rate should not change drastically with material system.

The diffusion rate controls diffusional solidification, a special case of which is isothermal solidification of the infiltrant and the eventual homogenization of the skeleton. Since, in a typical case, the liquid fills a small skeleton in approximately one minute, diffusional solidification would ideally take place over a much longer time period, e.g., an hour or two. The diffusion rate will be controlled primarily by the material system chosen. Selection of a material system is critical to controlling the time scale of the isothermal solidification. In particular, the diffusivity of the melting point depressant in the solid skeleton will have the greatest effect on the freezing. The basic components of the skeleton are usually dictated by other requirements. A part is typically specified as steel, or aluminum, etc. and thus, that metal or an alloy thereof will be the basic component of the skeleton. Part geometry is also typically not a variable the process designer can change. Using a slower diffusing melting point depressant can drastically increase the amount of time the skeleton has to fill with infiltrant before freezing begins to occur. Si, B and P can all be used as a melting point depressant in Ni. Of these, Si diffuses much more slowly than do B and P. Diffusivity also has a strong dependence on temperature, since it is an activated process that follows Arhennius dependence. Controlling infiltration temperature allows for some control of the diffusivity for a given material system. Reduced temperature decreases diffusivity and should allow more time for the liquid to fill the skeleton before freezing.

Coating the powder skeleton (or just the raw powder) with a finite time diffusion barrier slows the freezing by keeping the melting point depressant from leaving the infiltrant until the liquid has filled the part. Such a diffusion barrier can be another metal that has a lower diffusivity of MPD. The thickness of the barrier can be selected so that it only lasts for the duration of the infiltration. As the coating material begins to break down, it allows the MPD to diffuse through, allowing isothermal solidification and eventual homogenization. Ideally, the coating material itself is also relatively homogeneous throughout the part.

Distinction Between Low and High Solubility Systems

Returning to the case of a single element as melting point depressant, the solubility of the melting point depressant in the skeleton material also influences the diffusional solidification behavior. The solidus line on the phase diagram describes the solubility of the MPD in the solid, and the location of the final part bulk composition relative to this line will determine whether the part will completely solidify at that temperature or if there will always be liquid present at the infiltration temperature. The two most important factors in determining the bulk composition of the final part are: the packing density of the powder skeleton (which determines the liquid void fraction); and the infiltration temperature (which determines the infiltrant composition for a given material system assuming the infiltrant is at the liquidus composition).

In the first case of relatively high solubility, such as Ni—Si, characterized by the equilibrium phase diagram shown in FIG. 7A, solidification will proceed to completion and choke off the flow of liquid. It is therefore necessary to ensure that the liquid fills the entire part before the infiltrant solidifies. Several mechanisms for increasing the rate of infiltration relative to the rate of solidification are presented below.

As an example, a pure nickel skeleton infiltrated with an alloy containing silicon as a melting point depressant would likely fall into this category. The equilibrium phase diagram for Ni—Si is shown in FIG. 7A. Assuming a skeleton with packing fraction of 60% and an infiltration temperature of 1180° C., a bulk composition of ~4% would result from the liquidus composition of ~10% times the liquid volume fraction 0.4. Since this is significantly less than the solidus composition of ~7%, such a part would completely solidify diffusionally.

Figure 8:
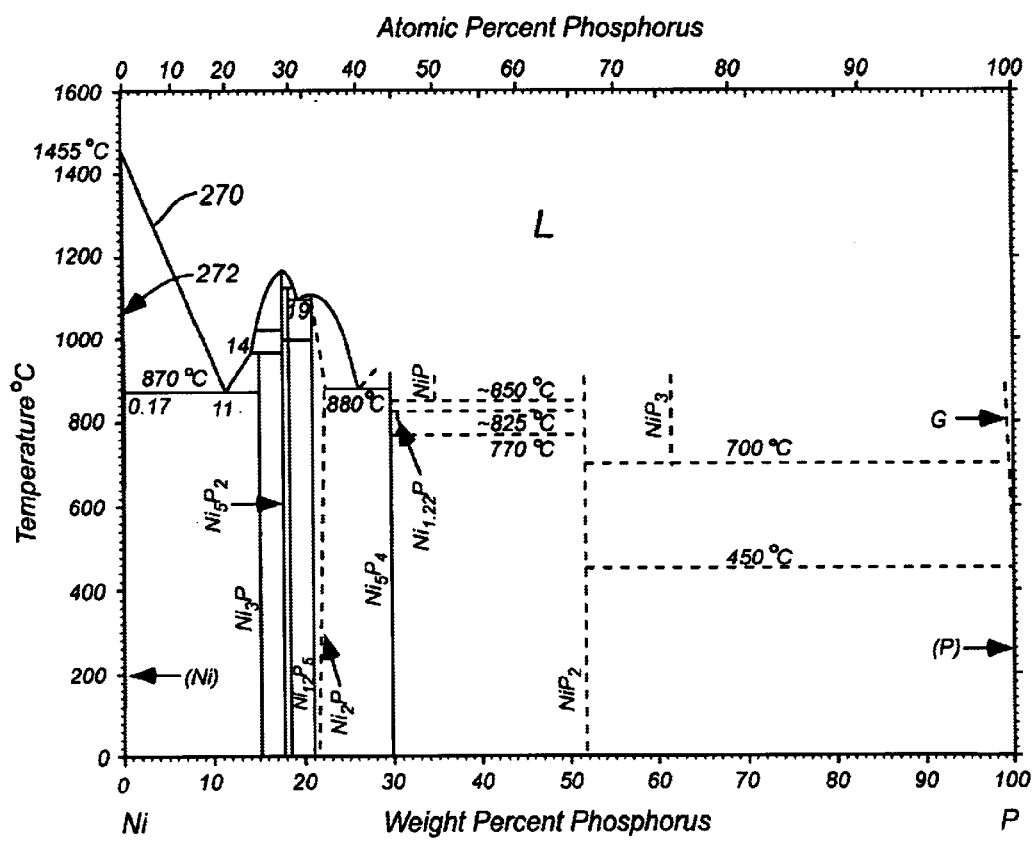
FIG. 8 is a nickel-phosphorous equilibrium phase diagram.

In a second case, of low solubility, when the bulk composition of the part lies in a two-phase equilibrium field, liquid will remain present in the infiltrated skeleton until the part is cooled below the infiltration temperature. It is possible that the liquid volume fraction may remain high enough to allow continuous flow through interconnected pores, such that any diffusional solidification that occurs would not prevent the part from being completely infiltrated. For example, consider a pure nickel skeleton infiltrated with a nickel alloy containing phosphorous as a melting point depressant. The Ni—P equilibrium phase diagram is shown in FIG. 8, with the liquidus line indicated at 270. The solidus line 272 is not discernible on this diagram, because it is so close to 0% P line, between 1455° C. and 870° C. A lower infiltration temperature of 1000° C. could be used and the liquidus composition of 7% P would result in a bulk composition of 2.8% P. Since the solubility of P in Ni is only 0.17%, only a small amount of P would diffuse into the skeleton at the infiltration temperatures and there would be very little solidification and restriction to the liquid flow.

Figure 9:
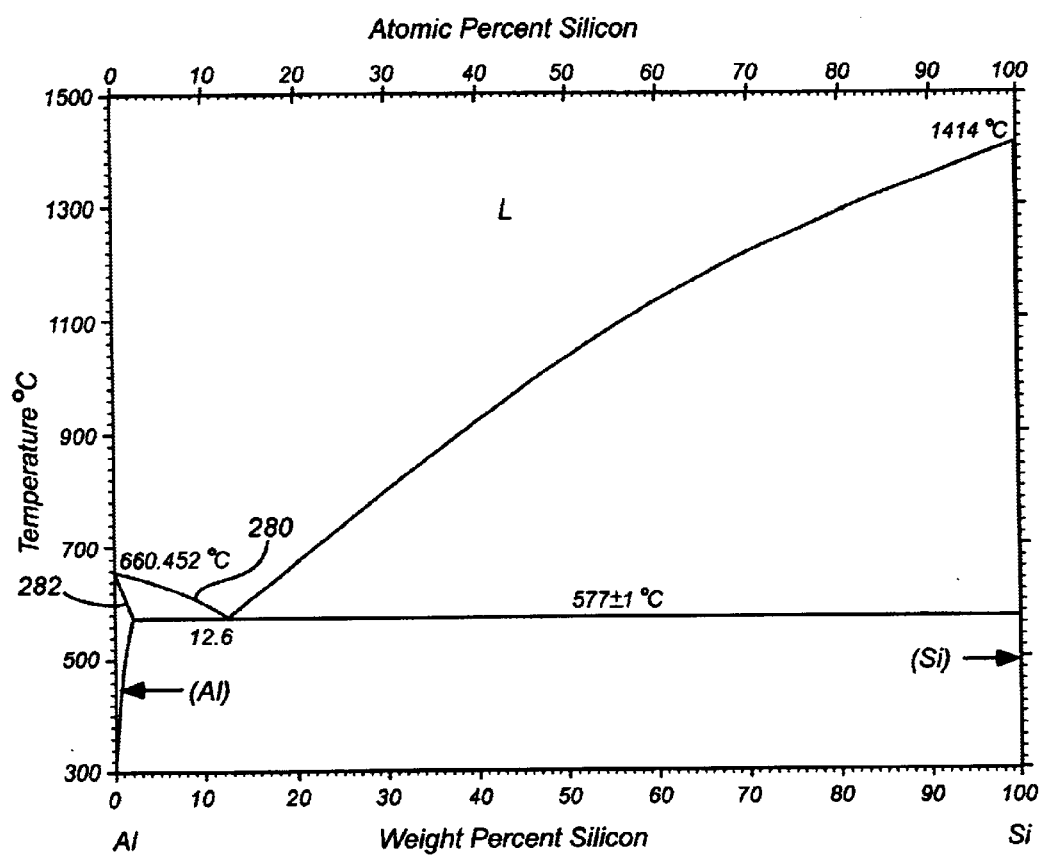
FIG. 9 is an aluminum-silicon equilibrium phase diagram.

Another material system with low solubility is the binary alloy of aluminum and silicon, with the equilibrium phase diagram shown in FIG. 9. The liquidus 280 and the solidus 282, along with the line at 577±1° C. bound a two-phase region. At an infiltration temperature of 600° C., there is approximately 2% solubility of silicon in aluminum. If liquid infiltrant at a composition of 10% Si filled the void space of a 60% dense pure aluminum skeleton, the bulk part composition would be 4% Si and would lie in a two-phase field of ~25% liquid as long as the skeleton remained at the infiltration temperature. In this case, the skeleton would absorb some Si, but diffusional solidification would occur only until the part was 75% solid. The liquid flow would not be completely choked off by the solidification, so the rate of diffusion and solidification need not be slow compared to the infiltration rate.

The final microstructure resulting in these cases of low solubility of the MPD in the skeleton material will not be a single-phase solid solution of the MPD in the skeleton material. The original interconnecting porosity space that was filled with liquid will have a two-phase microstructure. The aluminum-silicon system's result would resemble that of a cast microstructure. The powder particles that have absorbed Si would substitute for the primary dendrites that solidify first in a casting. The remaining infiltrant would have a eutectic microstructure similar to the regions of a casting between the dendrites that are the last to freeze. Since this type of microstructure is sometimes desirable and widely accepted in industry, the fact that the material composition is not uniform throughout is not a drawback. Two-phase strengthening is common for commercial net-shape casting alloys and can also be achieved in cases of infiltrated systems with low solubility.

By contrast, high solubility cases are more typical of commercial wrought alloys, relying on solid solution strengthening or precipitation hardening. Either the high or low solubility case will result in more uniform properties than traditional heterogeneous infiltration and will eliminate the disadvantages of poor machinability, poor corrosion resistance, temperature limitations, and difficulty in material certification.

It should be noted that even when diffusional solidification takes place, it is not necessary to wait for it to complete before lowering the processing temperature. Once the infiltrant has completely filled the skeleton, the skeleton can be cooled to another temperature, subsequent solidification and homogenization can continue to take place by diffusion. This could be useful because the solubility of the MPD in the skeleton typically changes with temperature.

Gating

If the infiltrant begins to wick in to the part as soon as a small portion of the infiltrant supply is molten, two problems result. First, as soon as infiltration begins, diffusion and homogenization also begin and the pores of the skeleton may become occluded by material that has undergone diffusional solidification. Thus, a small amount of molten infiltrant may cause the pores to clog before the general mass of infiltrant supply is available to enter the body. Second, if the infiltrant supply, during its preparation, has solidified into multiple phases (which will generally be the case), these phases will melt sequentially as the infiltrant supply heats up. Thus the first liquid available to enter the skeleton will not have the average composition of the infiltrant supply. These problems can be avoided by first creating a melt of infiltrant and allowing it to equilibrate thermally and chemically before putting it in contact with the skeleton to be infiltrated.

Further, it is advantageous to preheat the skeleton. If the skeleton is not preheated, the infiltrant will heat up the exterior of the skeleton where they contact each other and the infiltrant will begin to penetrate. The rate of penetration will be limited by the heating of the skeleton rather than just fluid mechanics, since the liquid would be unable to flow into colder areas of the part. In these initially penetrated regions, diffusion will begin upon contact and the pores may become choked off and prevent subsequent flow. Since the infiltration of the skeleton as a whole is limited by the need to heat up the interior of the skeleton, this problem can be avoided by preheating the entire skeleton.

Several gating methods have been used to initially separate the melt from the skeleton, then control the introduction of the liquid. By "gating," it is meant mechanically separating the skeleton and the liquid infiltrant supply, and then bringing them together. The motion of a linear or rotary feedthrough from outside the furnace can be translated to open a 'gate' and introduce the liquid to the skeleton.

One gating method is to suspend the skeleton before infiltration and dip it into a pool of the molten infiltrant. Either the skeleton can be lowered, or the pool can be raised, or both, to bring the skeleton and the pool together.

If the skeleton is too delicate to hang under its own weight, then a mechanism should be used to allow a gated infiltration with the part resting in a crucible. It can be difficult to create a hermetic fluid seal that will hold at the infiltration temperature, but using a crucible material that is not wet by the infiltrant makes a seal possible. Two such mechanisms have been used successfully. The first is a vertical alumina plate used to separate a rectangular crucible into two halves. The shape of the plate must match the cross-sectional profile of the crucible, so a bisque-fired alumina plate was cut and filed to maintain less than 1 mm gap when fitted to the crucible. This gap was sufficient to hold a 2 cm deep pool; a deeper pool would require closer tolerances or filling of any gaps with a coarse alumina powder. A more elegant solution is to use an alumina tube with a cleanly cut end to sit vertically, with the end flush with the bottom of the crucible. The infiltrant supply is placed inside the tube and the melt is contained until the tube is lifted from above.

Several other methods can be used for gating the infiltration. One method involves a custom crucible that has a hole at the bottom. This hole is plugged with a ceramic rod to prevent infiltrant flow until the rod is removed. The infiltrant flows through the hole into another vessel, below, that holds the skeleton. Another method is to tip a container of infiltrant supply, allowing the liquid to flow out of the container. Further, the vessel used to contain the infiltrant supply can be flexible. A woven cloth of alumina fibers has been used to contain liquid metal. Such a cloth bag can be used to contain the melt and then opened up to allow the liquid to flow out.

The actuation of any type of gate requires a linear or rotary motion actuator passing through the gas-tight shell of the furnace. In the case of nickel parts fired in a forming-gas atmosphere, the feedthrough can be a rod sliding through a slightly oversized hole in the shell. If the internal pressure in the furnace is maintained to several inches of water, the leak will not allow air into the furnace to contaminate the atmosphere. In applications where atmosphere purity is more critical, several linear and rotary motion feedthroughs designed for high vacuum applications are available commercially.

Powder Size and Size Distribution

The choice of powder size, defined for spherical powder by the diameter, has a substantial effect on the depth of penetration of infiltrant into the skeleton. For simplicity of discussion, the case of particles which are spherical and which are substantially mono-modal will be considered. This means that a given skeleton is made of spherical particles that are all approximately the same size. Initially, it will be assumed that the particles have smooth surface texture. (Particles with non-smooth surface texture are discussed below). Four physical phenomena are influenced by the particle size:

1. The capillary pressure developed by the infiltrant increases as particle size decreases. The capillary pressure is the pressure developed across the interface between the ambient gas and the liquid infiltrant due to the curvature of the surface of liquid infiltrant between the skeleton particles. It is the capillary pressure that causes the infiltrant to be wicked into the skeleton. Thus, other things being equal, the higher the capillary pressure, the faster the infiltrant will wick into the infiltrant. If the infiltrant wicks in quickly, it can penetrate farther before any choking off of the pores due to diffusional solidification. An expression for the capillary pressure may be developed by applying the Laplace equation to the meniscus between the particles. Alternatively, the capillary pressure $\Delta p$ may be expressed as a function of the surface area per unit volume of a powder bed as follows [G. Scherer, "Theory of Drying," *J. Am. Ceram. Soc.*, 73, pp. 3–14 (1990).]:

$$\Delta p = \frac{\gamma_{LV} \cos(\theta) S_p}{V_p} \quad (1)$$

where $\gamma_{LV}$ is the liquid/vapor interfacial energy, $\theta$ is the contact angle of the liquid with the solid, $S_p$ is the surface area of the pore space and $V_p$ is the volume of the pore space. For mono-modal spheres it can be shown that $$\frac{S_p}{V_p} = \frac{6(1-\varepsilon)}{D\varepsilon},$$

where $\varepsilon$ is the void fraction and D is the powder diameter.

2. The maximum height to which infiltrant can rise in the skeleton, (in the absence of diffusional solidification and choking off of the pores) increases as particle size decreases. This effect is due to the increase in capillary pressure with decreasing particle size. As the infiltrant rises up the skeleton, the capillary pressure must be sufficient to overcome the pressure due to the static head of the liquid metal in the skeleton. This static head is related to the density of the liquid $\rho$, acceleration of gravity g, and height h above the free liquid surface as follows [James A. Fay. *Introduction to Fluid Mechanics*. MIT Press: Cambridge, Mass. 1994.]:

$$P_{gravitational\ head} = \rho g h \quad (2)$$

The maximum possible height of this liquid is attained when the gravitational head (Eq. 2) is equal to the capillary pressure (Eq. 1).

3. Increasing the size of the particles leads to larger pore spaces between them and a reduction of the effect of viscous drag on the flowing infiltrant. Darcy's Law describes how the pressure gradient in a porous medium is directly proportional to the volume-averaged velocity of the fluid:

$$\nabla p = -\frac{\mu}{K} V \quad (3)$$

where $\mu$ is the fluid viscosity, and K is the permeability of the medium [Fay].

For the case of mono-modal smooth spherical powder, the permeability of a powder bed can be predicted by the Carman-Kozeny relation [Phillip C. Carman. *Flow of gases through porous media*. Butterworths:London. 1956.]:

$$K = \frac{\varepsilon^3}{5S^2(1-\varepsilon)^2} \quad (4)$$

where $\varepsilon$ is the void pore fraction of the powder bed and S is the specific surface area, which is equal to 6/D for monomodal spheres.

Thus, other things being equal, it is believed that a powderbed with a higher permeability will allow the liquid infiltrant to penetrate faster and therefore penetrate farther before the pores are choked off by diffusional solidification.

4. Increasing the size of the powder reduces the surface area of the powder per unit volume of the skeleton. The diffusion of the melting point depressant occurs through the surface and therefore reducing the surface area in turn slows down the diffusional solidification and allows for a greater infiltrant penetration distance before the pores are choked off. Similarly, larger powder requires the MPD to diffuse over a longer distance to reach the interior volume of each particle. Thus, other things being equal, it is believed that increasing the size of the powder results in a longer time available for infiltration before diffusional solidification chokes off the pores and therefore, greater penetration.

It is important in many cases to attain greater penetration of the infiltrant before choke-off occurs. Thus, the powder size is a very important variable. If the skeleton is made from very fine powder (for example metal powder of 20 microns and smaller, down to, for instance, even 1–3 microns), the capillary pressure will be high and the maximum height to which infiltrant can rise will be high. However, the viscous drag of the penetrating infiltrant and the surface area available for diffusion leading to isothermal solidification will also be high. Because decreasing the powder contributes toward the greater penetration distance in two ways and also detracts from greater penetration distance in two ways, the details of the relationships must be examined to gain guidance about the choice of particle size that will maximize penetration distance.

To understand the relationships, a relatively simple system is considered first. In this simple system no diffusion, and therefore, no diffusional solidification, takes place. Further, the melt is penetrating horizontally relative to a vertical gravitational field. In such a case, only two of the four factors above are operative—the change in capillary pressure with particle size and the change in viscous drag with particle size. While these factors act in opposite directions, the viscous drag is sensitive to particle size squared, while the capillary pressure is only directly proportional to particle size, as can be seen from equations 1, 3 and 4. In other words, as particle size increases, the viscous drag drops off faster than the capillary pressure. The result is that the penetrating liquid moves faster through the skeleton as the particle size increases.

The next case to consider is one where diffusion and diffusional solidification take place also. The only one of the four effects listed above which is not at play is the need of the infiltrant to rise against gravity. An increase in powder size will even more strongly favor penetration, because increased powder size reduces the rate of diffusion of the melting point depressant into the powder.

Only when one considers an infiltration that is proceeding vertically (against gravity), does one see an effect that limits the effectiveness of increased particle size in attainment of greater penetration distance. As the particle size is increased, the maximum height to which infiltrant can rise, decreases. Thus, as particle size is increased, the height attained by the infiltrant will increase only up to this limit imposed by capillarity and gravity. In fact, as this limiting height is approached, the infiltration will proceed ever more slowly, as there will be little pressure remaining to drive the flow. Diffusion and diffusional solidification will have more time to act and thus, it will be difficult to ever attain the full value of this limiting height.

A discussion of a method of designing a process to manufacture a part follows. The designer is typically faced with infiltrating a body of a height specified by the design project. In such a case, the designer would first choose a relatively small particle size (to attain the best surface finish possible) and increase the size of the particles as needed to gain infiltration throughout the body and up to the top (if proceeding vertically against gravity) of the designed part. However, if the body is too tall for infiltration it may not be possible to pick a particle size large enough, because the limitation imposed by the gravitational head may be reached before reaching the top of the part. The combination of equation 1 and 2 predicts the maximum capillary rise height. For example, for liquid metal, with a surface tension of ~1 N/m, density of 8 g/cc, and a 60% dense skeleton of 250 micron diameter powder, the rise height would be:

$$h = \frac{\gamma_{LV} \cos(\theta) \cdot 6(1-\varepsilon)}{D \varepsilon \rho g} = 0.45 \text{ meters}. \tag{5}$$

The discussion above has been in the context of substantially mono-modal powders. In a bimodal powder, where fine powder is added and used to fill the interstices between the larger powder, the fine powder increases the capillary pressure, but it also very substantially increases the viscous drag and results in a decrease in the infiltration speed of the molten infiltrant.

Surface Area

Figure 10:
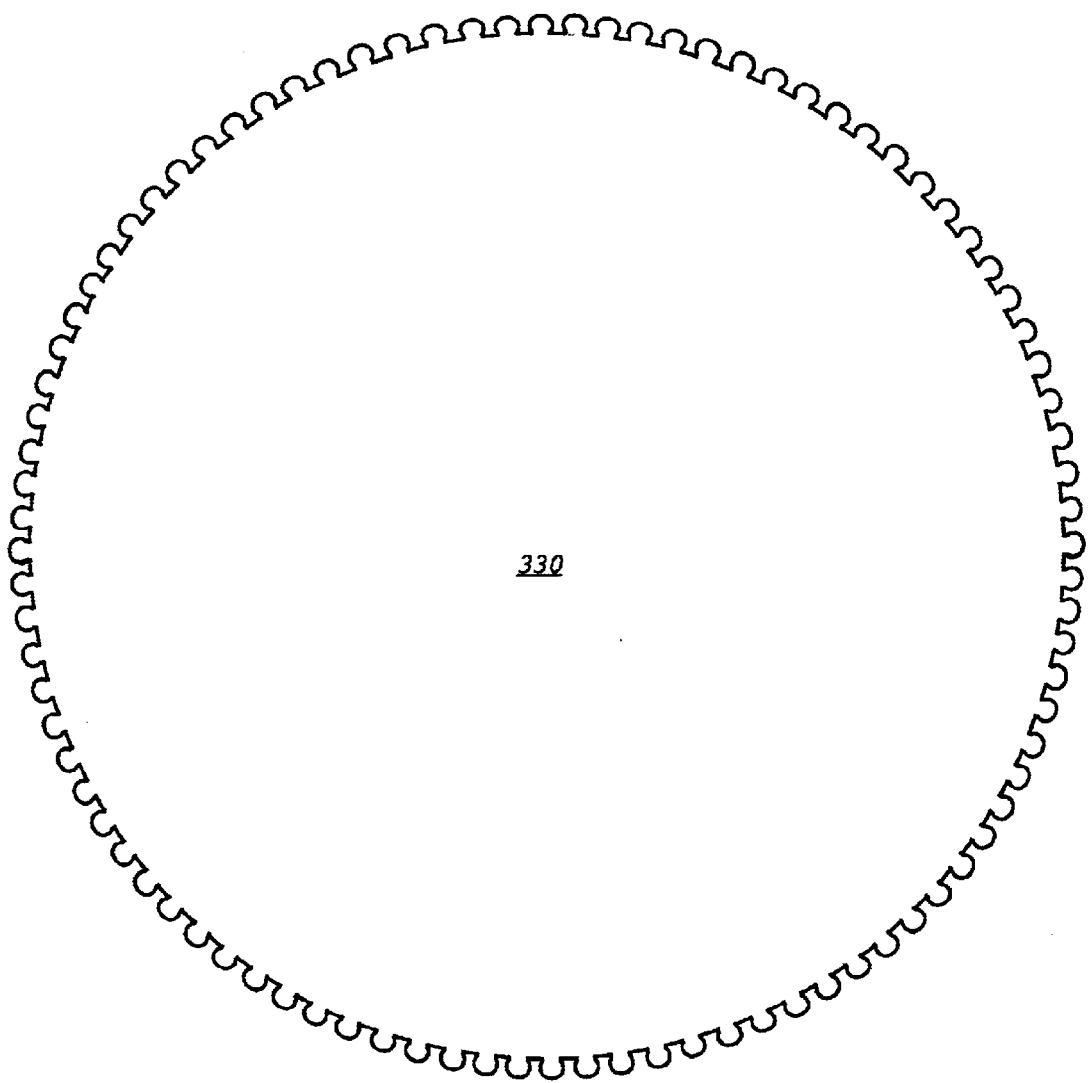
FIG. 10 shows schematically a cross-section of a base powder particle coated with surface powder ⅟50 the size of the base powder, to increase capillary pressure.
Figure 11:
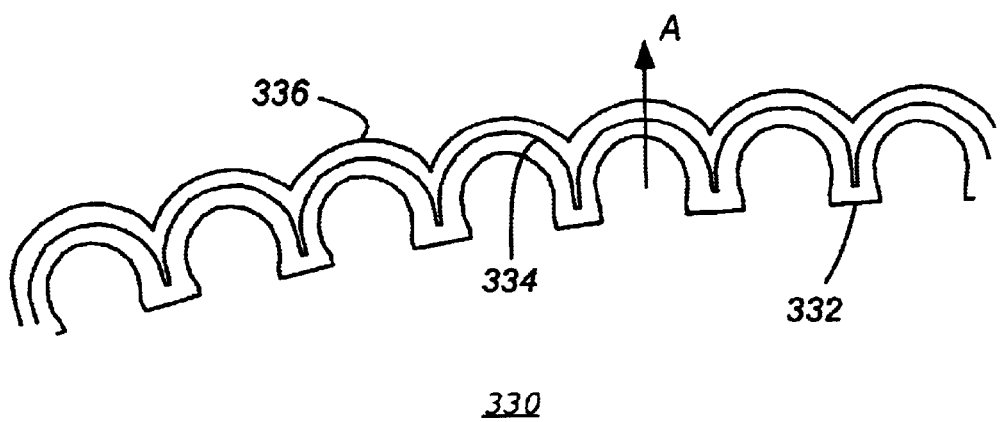
FIG. 11 shows schematically smoothing effect of a moving solidification front, with the initial surface matching that of FIG. 10, with the interface shown moving in steps of ¼ of the diameter of the surface powder.

A further method to attain greater penetration distance of the molten infiltrant before diffusional solidification is to increase the surface area of the powder, but without changing its basic size. FIG. 10 shows schematically a powder particle 330 which has a texture on the surface resulting in increased surface area. By such means, it is possible to increase the surface area of a powder particle by a factor of two or more. The capillary pressure is related to the surface area per unit volume. Thus such texturing will increase the capillary pressure proportional to the increase in surface area because the volume remains approximately the same. Further, such texturing has only minimal effect on the size and shape of the pore spaces between the particles and thus has minimal effect on the viscous drag of the infiltrant through the skeleton (although the roughness does very slightly increase the drag). Following the reasoning above, the penetration of a non-diffusing infiltrant is faster in a skeleton made with powder with non-smooth surface texture, because the capillary pressure increases much faster than the small increase in viscous drag. The increase in surface area will, however, lead to an increase in the rate of diffusion in the case of a melt with a diffusing species. However, this increase in diffusion will apply only at the initial contact between the melt and the powder, because the initial solidification will tend to smooth out the powder particle, as shown in FIG. 11. The solid/liquid interface is moving in the direction of the arrow marked A. The initial surface 332 has relatively sharp indentations and greater surface area, as compared to subsequently formed surfaces 334, 336. Thus, the net effect of surface texture on the penetration of a melt with a diffusing species is beneficial— that is, greater penetration distance before diffusional solidification.

Figure 12:
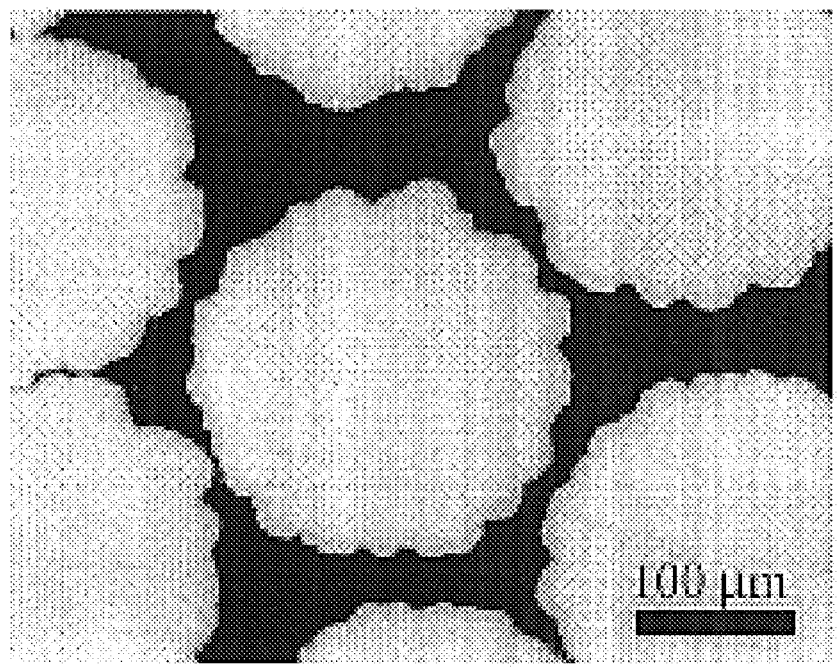
FIG. 12 is a digital image that shows schematically a cross-section showing enhanced surface texture of nickel powder made by hydrometallurgical processing.

FIG. 12 is a digital image that shows a cross section through nickel powder particles made by hydrometallurgical processing. This process results in some degree of surface texturing of the type desired. For the particle illustrated, the increase in surface area over a spherical particle is only about 25 percent. Changes in the deposition parameters may result in a more accentuated surface area. A method to achieve a surface texture similar to that shown in FIG. 10 is to coat large powder particles with a single layer of much finer powder (50:1 powder diameter ratio shown in the figure) and to sinter that finer powder particles into place. In general, the coated powder is between 10 and 1000 times the size of the coating powder, and preferably between 20 and 200 times the size. For example, 200 micron nickel powder is coated with 2 micron nickel powder. In principle, an increase of a factor of five in surface area is possible using such a technique. Alternatively, etching techniques can be used to create surface textures. One such technique is vapor-phase etching. This would tend to create grooving along the grain boundaries and other crystallographic defects in the powder.

Fluid Supply Tabs

Figure 13:
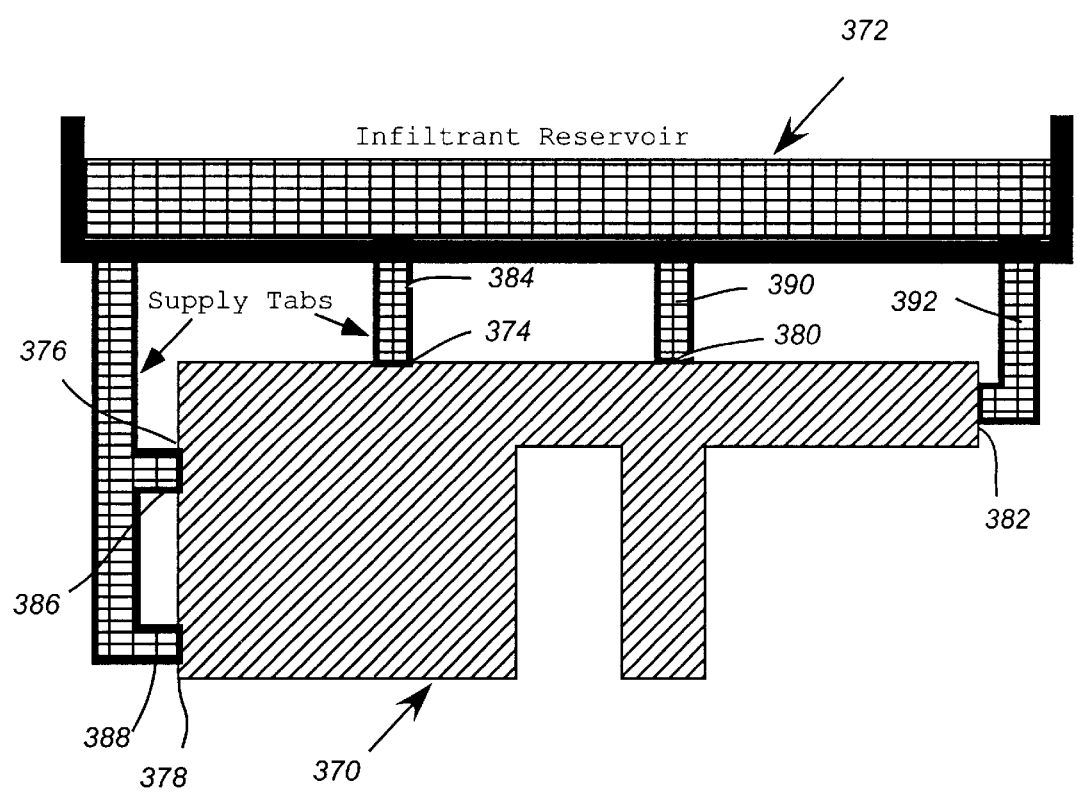
FIG. 13 shows schematically external supply tabs used to feed infiltrant to several entry points of a part skeleton from an infiltrant reservoir above the part.

To fill skeletons with dimensions larger than the penetration distance limit due to freezing, other techniques are required. Variation of the entry point of the liquid infiltrant can be used to alleviate some of these problems. FIG. 13 shows a skeleton 370 and an infiltrant reservoir 372. Infiltrant can be supplied to multiple areas 374, 376, 378, 380, 382 of the part 370 rather than just the bottom surface. External fluid supply tabs 384, 386, 388, 390, 392 can bring liquid infiltrant to any area of the skeleton's surface. This reduces the limitation on a maximum dimension to a less stringent limitation of maximum part thickness. FIG. 13 shows the tabs supplying infiltrant with the aid of gravity, in which case they could be hollow tubes allowing the infiltrant to easily flow through them. However, they can also be arranged to provide fluid from a melt pool underneath the part. In this case, they would need to have a porosity suitable to draw infiltrant up to the required height by capillarity. The tabs could be inert relative to the infiltrant to prevent any change in composition or undesirable closing off of pores. The porosity of the tabs would be relatively coarse as compared to the skeleton to permit liquid infiltrant to travel through quickly.

Feeder Channels

Figure 14:
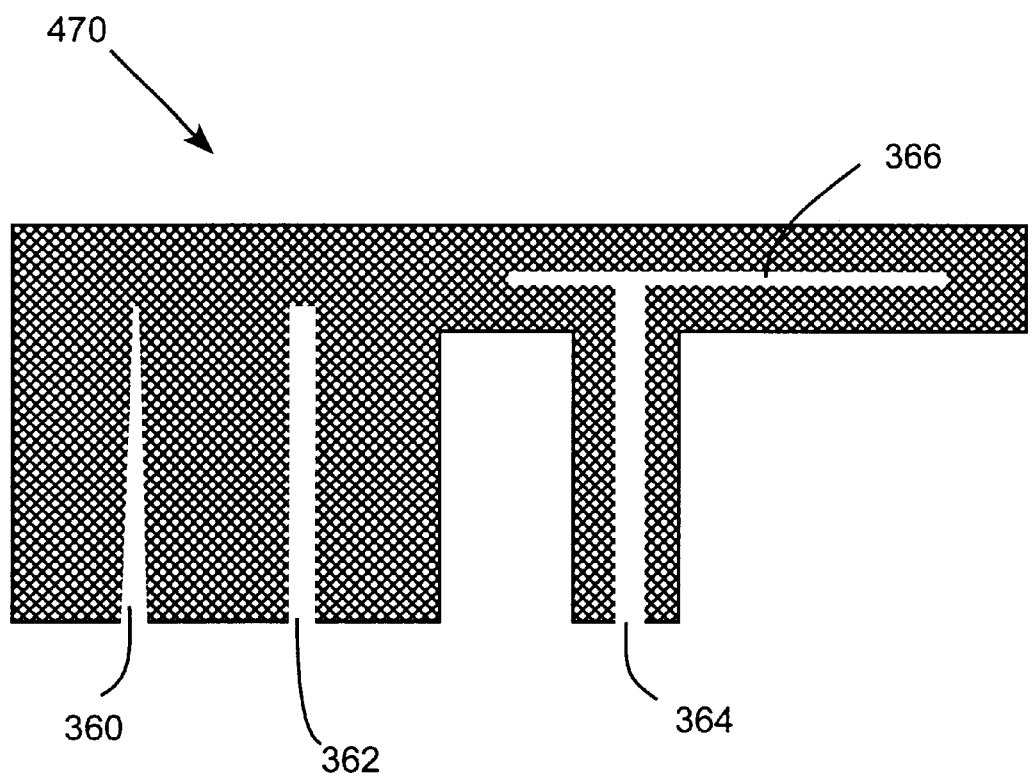
FIG. 14 shows schematically a network of internal feeder channels built into a part skeleton to facilitate liquid flow to remote areas without freezing, the channels having variable diameter (left) or change in direction (right) including both horizontal and vertical runs.

Also, as shown in FIG. 14, solid freeform fabrication technologies used to create the powder skeleton can create internal feeder channels 360, 362, 364, 366 to carry the liquid to remote areas of the skeleton 470. Such channels are considerably larger diameter (by a factor of 5 or more, preferably between 5 and 10) than the pore sizes and allow the liquid infiltrant to flow through the feeder channels quickly without freezing. Indeed, for some SFF processes, the size of such channels would need to be at least three times larger than the powder diameter to facilitate powder removal during fabrication of the skeleton. A network of such channels can be designed into a part of complex geometry and function as major arteries to supply liquid infiltrant to the extremities. A relatively simple example is shown in FIG. 14, but the channel geometry could be much more sophisticated if necessary. The feeder channels can have a uniform cross section 362, or varying 360 (for instance being larger nearer to the infiltrant supply contact surface than farther from it). The feeder channels can be vertical, horizontal, inclined, interconnected, or independent.

In the case of relying on capillary forces to fill the feeder channels, their size must be small enough to reach sufficient rise height, given by the following equation [Fay]:

$$\text{Pressure} = \rho g h = \frac{2 \gamma \cos(\theta)}{r} \tag{6}$$

with the definition of variables from equations 1 and 2, and r is the radius of the channel. For a typical liquid metal surface tension of 1 N/m, a 1 mm diameter channel would provide 4 kPa capillary pressure. For liquid Ni of density 8 g/cc this would correspond to a rise height of 5 cm. Channels 360 can be made with variable diameter, starting larger at the bottom and decreasing in size at the top to facilitate greater capillary rise. Note that this would be a limitation on the height, but not on distance; horizontal sections 366 would result in no loss of head.

Feeder channels can prove useful for overcoming a short penetration distance limit when small powder, such as 20 micron, is used. Small powder is more likely to have a short penetration distance limited by freeze-off of the infiltrant. For instance, if the penetration limit for a skeleton of 20 micron powder were only 2 cm, a network of internal feeder channels can be designed into a 5 or 10 cm part such that no section is more than 2 cm from a feeder channel supplying liquid infiltrant. In general, feeder channels can be arranged so that no region of the skeleton is spaced from a feeder channel more than the penetration limit. Infiltrant will pass from the feeder channels to the body of the skeleton through the walls of the feeder channels along essentially their entire length. The composition in the solidified feeder channels would match that of the infiltrant rather than the bulk composition of the homogenized part.

Skeletons with Fine Surface Texture Relative to Interior

Figure 15:
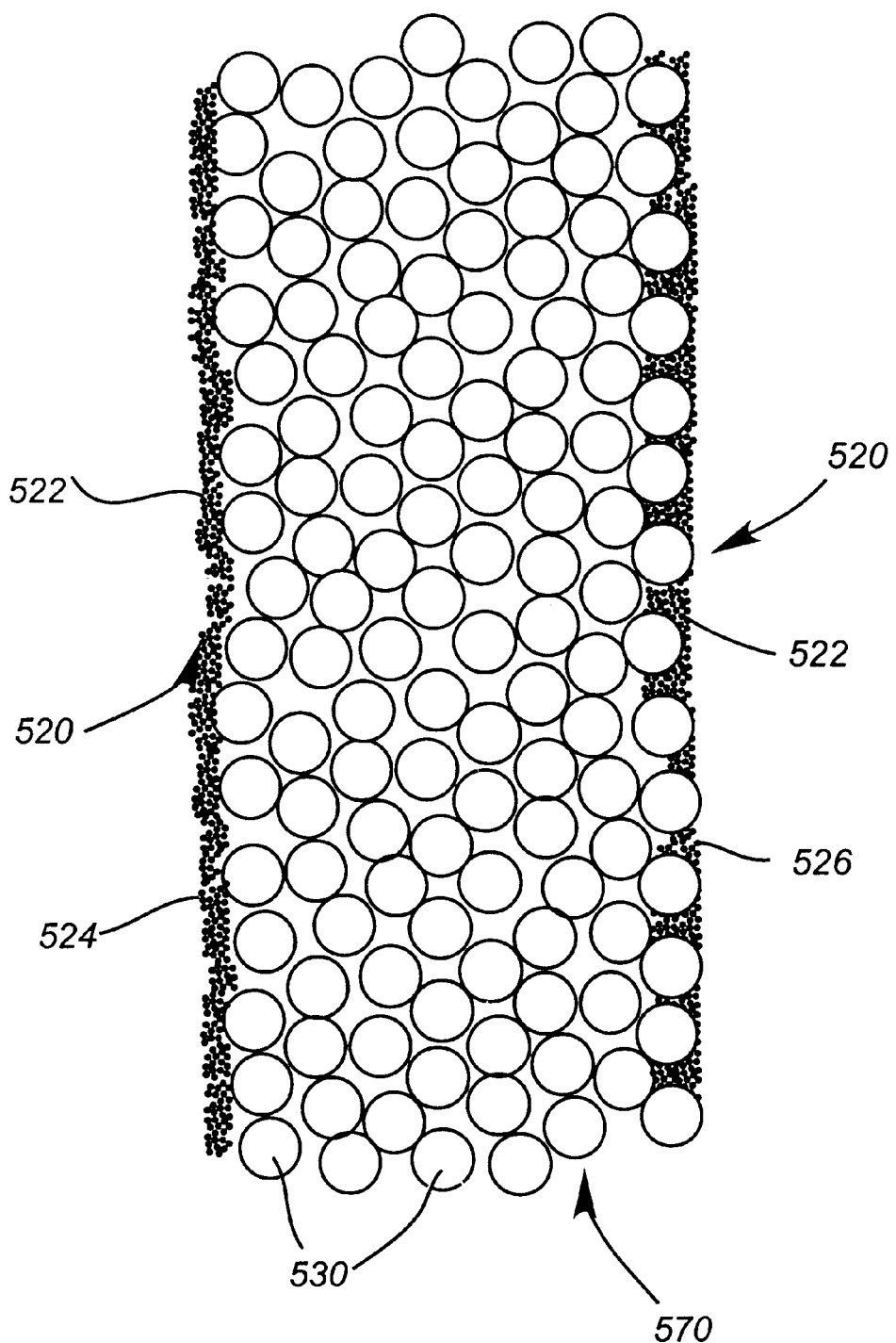
FIG. 15 shows schematically, in cross-section, surface texture refinement achieved by adding a paste of fine powder to an external surface of a skeleton of larger powder, the paste forming a thin shell outside the skeleton (left) or penetrating and filling the space between powder near the surface (right)

A large penetration distance may be attained together with good surface finish in another manner shown schematically in FIG. 15. First, create a skeleton 570 out of a powder 530 that is large enough to allow infiltration up to the desired height without choking off the pore space. Next, apply a paste 520 of fine metallic powder 522 with a particle size significantly smaller than the size of the particles 530 constituting the skeleton 570. The paste is then applied to the surface of the skeleton to create an outer layer that has a surface finish superior to the original skeleton, this outer layer is referred to as the covering layer. The paste may be made with polymeric vehicles as thickeners and binders and may be formulated to have a solids loading of typically 20–50% by volume metal powder. The skeleton 570 with the paste applied is then fired to burn out any polymer in the paste 520 and to sinter the fine powders in place. The skeleton with fine outer covering layer is now infiltrated according to the manner of this invention described above. The liquid infiltrant penetrates through the main body of the skeleton traveling rapidly through the large particle core. The infiltration slows appreciably as the infiltrant reaches the covering layer 520 of the fine powder paste. However, the infiltrant will only have to penetrate a small distance through this layer of fine material and thus it will not choke off due to diffusional solidification. The thickness of the covering layer must be less than the penetration distance limit due to diffusional solidification, but this constraint is easily satisfied because the typical layer thickness is less than one diameter of the larger particles. The fine powder could also be applied during the fabrication of the part by selective deposition of slurry during the SFF process. Such slurry deposition processes are described in PCT/US98/12280, JETTING LAYERS OF POWDER AND THE FORMATION OF FINE POWDER BEDS THEREBY, filed Jun. 12, 1998, published Dec. 17, 1998, which is incorporated fully herein by reference.

The size of the powder 522 in the paste 520 should be between approximately 1/100 to 1/10 the size of the powder 530 in the main body of the skeleton. Thus, if 200 micron powder is used for the skeleton, the paste should contain particles in the size range of 2–20 microns. The particles in the paste may be all of approximately one size, or might span a range of sizes.

FIG. 15 shows two approaches to application of the paste 520 to the skeleton 570. 1) The paste may be applied to the surface of the skeleton to create a skin 524 of finer powder over the surface (as shown on the left side of figure). 2) The paste can be designed to penetrate into the pore spaces 526 and to smooth the surface by filling in the space between the larger powder particles 530, but not result in a layer on top of the larger particles (as shown on the right side of figure). The second approach 526 has the advantage of accurately maintaining the geometry of the original component. However, if the composition of the fine powder in the paste is the same as that of the large powder, the composition of this region after infiltration and homogenization will be different than that of the interior of the skeleton. This is because the packing density of the larger powder with the additional fine powder in the pore will exceed that of the original skeleton. This is an advantage of the first approach, in that the packing density of the applied layer will be approximately the same as that of the bulk of the skeleton. However, the final composition using the second approach can be made the same by using a fine powder in the paste that has a composition different from that of the large powder. The composition of the finer powder would actually have to match that of the infiltrant, but some combination of the two approaches (skin over the surface and penetration of the paste) along with a carefully selected fine powder composition could provide a desirable result. It may also be desirable to alter the properties of the part near the surface, which could be done through appropriate material selection for the fine powder. For instance, high surface hardness can minimize wear due to friction and a material with higher hardness could be selected for the fine powder.

Maintaining Part Shape

Figure 16A:
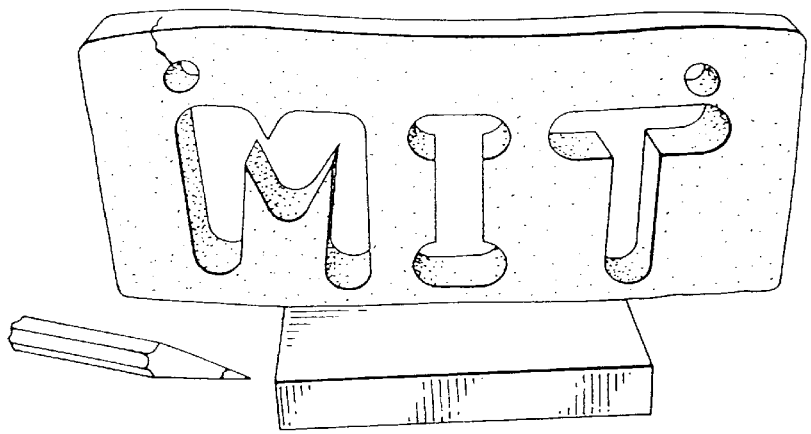
FIG. 16A shows schematically distortion of a nickel skeleton (first letter is deformed) which occurred while hanging the skeleton at 1200° C.
Figure 16B:
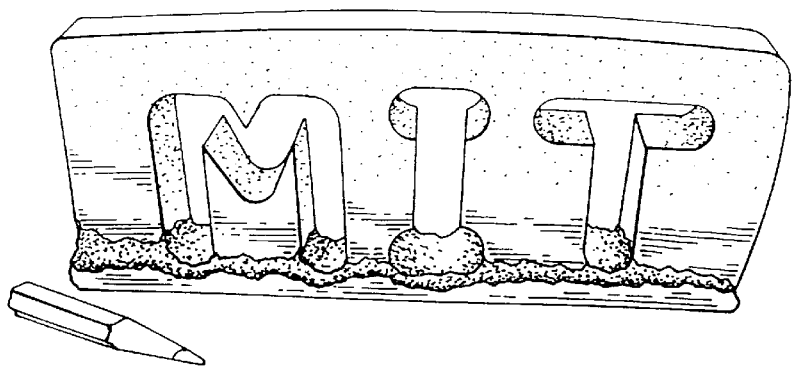
FIG. 16B shows schematically a similar part without distortion that was resting on a flat crucible bottom.

Since infiltration is accomplished at temperatures close to the melting point or solidus temperature of the skeleton, the mechanical strength of the skeleton at the infiltration temperature might be very low. Part distortion has been encountered when suspending odd shaped parts above the melt. Distortion can happen during the high temperature sintering, prior to infiltration. A first step in minimizing part distortion can be achieved either through changing the shape of the part or by supporting the part from beneath rather than suspending it. FIGS. 16A and 16B show how a large part that underwent distortion while hanging (16A) (note holes for suspension support) experienced little or no distortion while resting on the floor of a crucible (16B). For intricate part shapes, simple floor support may not suffice. A loose ceramic powder can be filled around the metal part to support parts with intricate geometry. The infiltration can occur even while the part is embedded in ceramic, because the ceramic powder is typically not wet by the infiltrant, and thus the infiltrant will not enter those regions.

Material Systems

Selection of appropriate material systems involves the choice of skeleton material and MPD, with consideration for the degree of infiltrant melting temperature depression, diffusivity and solubility of the MPD in the skeleton material, and the desired final material composition.

The inventors have conducted extensive experimental work involving the binary Ni—Si material system, using a skeleton material of pure nickel and an infiltrant of ~90% Ni with the addition of ~10% Si. The specific amount of silicon used depends on the infiltration temperature. Additions of other alloying elements to this binary system can provide different, and for some applications, more desirable mechanical properties. Such possible alloying elements include, but are not limited to Chromium (Cr), Iron (Fe), Cobalt (Co), and Molybdenum (Mo). Several commercial alloys such as Inconel 617, HX, and G3 contain a combination of those alloying elements along with 1% Si. For example, chromium added to the Ni—Si system acts as a solid solution strengthening element. (Commercial nickel brazing alloys containing silicon typically contain 20% chromium for this reason.)

Other possible melting point depressants for nickel-based alloys include boron (B), phosphorous (P), and tin (Sn). Boron and phosphorous are used extensively in commercial brazing alloys. They both have very low solubility, and would result in a two-phase final part composition. Tin has a fairly high solubility that would enable homogenization. Antimony (Sb) and sulfur (S) also provide deep eutectics with nickel. Addition of large quantities of copper (Cu) can significantly depress the melting point of nickel. As an extreme case, a nickel skeleton infiltrated with pure copper would also undergo diffusional solidification, due to the complete solubility of the two elements with each other.

Aluminum (Al) offers many potential melting point depressants. Table 1 summarizes the effect of several alloying elements commonly used in aluminum. Pure aluminum has a melting point temperature of ~660° C. Copper and magnesium (Mg) are typically used to provide strengthening at small concentrations. Silicon is used extensively in die casting alloys to improve fluidity of the melt. Marching existing commercial die-casting alloy concentrations would be useful, and can be done as an aspect of an invention disclosed herein. Ternary and quaternary alloys can provide additional melting point depression. For example, an aluminum alloy commonly used in die casting of automotive pistons (336.0) contains 12Si-2.5Ni-1Mg-1Cu, has a solidus of 540° C. and a liquidus of 565° C.

TABLE 1

Effect of various alloying elements on the melting point of aluminum.

| Alloying Element in Aluminum | Eutectic Comp (wt %) | Melting Point (° C.) | Melting point depression (° C.) |
|---|---|---|---|
| Silicon (Si) | 12 | 577 | 83 |
| Magnesium (Mg) | 35 | 450 | 210 |
| Copper (Cu) | 30 | 548 | 112 |
| Germanium (Ge) | 50 | 420 | 240 |
| Lithium (Li) | 8 | 596 | 64 |

One challenge for aluminum is to conduct the transient liquid-phase infiltration within a small temperature window, since the melting point depression of the infiltrant may be less than 100° C. Fortunately, the lower operating temperature of aluminum allows for easier manipulation of the part and the melt.

The diffusivity of silicon in aluminum is ~$10^{-12}$ m$^2$/s at 600° C., which is about one order of magnitude higher than that of silicon in nickel at 1200° C. The diffusion distance is only affected by the square root of the diffusivity, but this still presents more of a challenge in achieving large infiltration depth as compared to a Ni—Si system. Factors such as grain size and the presence of other species can influence the diffusivity. Addition of iron to the infiltrant may be used to slow mass transport, because of a high affinity of iron for ordering with silicon and a lack of solubility of iron in aluminum. Copper acts as an excellent barrier to Si diffusion and can be electroplated on aluminum powder. The diffusivity of Cu in Al is similar to that of Si, so the coating will nor last long at the infiltration temperature, but a higher concentration of Cu at the surface of the powder could still slow the mass transport appreciably. The lower solubility of silicon in aluminum (as compared to in Ni) will typically result in the liquid flow never being choked off due to solidification. This is because the part will only undergo partial diffusional solidification at the infiltration temperature if the MPD final hulk composition is greater than the MPD solidus composition.

Another challenge of processing aluminum alloys derives from the natural formation of a thin surface layer of aluminum oxide, potentially preventing wetting of the infiltrant, and having other detrimental effects. The oxide grows faster at higher temperature. Thus, minimizing the time the skeleton is exposed to elevated temperature is beneficial and can be done through fast temperature ramp rates and short dwell times. The furnace atmosphere can also be controlled to slow the oxidation process. Using flux can also help break down the oxide layer. Specific flux materials include, but are nor limited to boric acid or others commonly used in the aluminum welding and soldering industries. Adding small amounts of magnesium also has a beneficial effect at breaking up the surface layers of aluminum oxide. Using detergents or wetting aids to allow the molten infiltrant to wet the oxide layer would also facilitate infiltration.

It should be understood that in the claims appended hereto, if the transitional phrase "consisting essentially" is used, the inventors intend the claim to read on a composition that has the materials identified in the claim and also small amounts of flux, detergent, wetting agent, or magnesium, or other similar materials, which small amounts do not adversely affect the depression of the melting point.

An approach for infiltrating steel skeletons Involves using multiple alloying elements to achieve the melting point depression of the infiltrant. The ternary, quaternary, and greater complexity alloys can provide significantly more depression of the melting point than is achieved through any of the individual binary alloys. Further, the concentration of alloying elements in the infiltrant can be more than double that of the desired final composition, because the infiltrant fills less than half of the total part volume.

Table 2 below shows the melting range (characterized by the liquidus and solidus temperatures) and composition of two common stainless steels, 316 and 17–4 PH, along with the melting range of an infiltrant that may be used to reach that standard composition.

TABLE 2

Melting ranges of 316 and 17-4 PH stainless steels and potential infiltrants.

| Material | Liquidus (° C.) | Solidus (° C.) | C (%) | Mn (%) | Si (%) | Cr (%) | Ni (%) | Mo (%) | Cu (%) | Nb (%) |
|---|---|---|---|---|---|---|---|---|---|---|
| 316 | 1400 | 1339 | 0.08 | 2 | 1 | 17 | 12 | 2.5 | | |
| Infiltrant | 1292 | 1135 | 0.2 | 5 | 2.5 | 17 | 30 | 6.25 | | |

TABLE 2-continued

Melting ranges of 316 and 17-4 PH stainless steels and potential infiltrants.

| Material | Liquidus (° C.) | Solidus (° C.) | C (%) | Mn (%) | Si (%) | Cr (%) | Ni (%) | Mo (%) | Cu (%) | Nb (%) |
|---|---|---|---|---|---|---|---|---|---|---|
| 17-4 PH | 1406 | 1237 | 0.07 | 1 | 1 | 16.5 | 4 | | 4 | 0.3 |
| Infiltrant | 1298 | 1205 | 0.175 | 2.5 | 2.5 | 16.5 | 10 | | 10 | 0.75 |

For these cases, the skeleton is composed of pure iron with a melting point of 1538° C. or iron and chromium with a similar melting point. The infiltrant contains all of the necessary alloying elements for the final composition so match that of the standard stainless steel. For a 60% dense skeleton, this requires the contribution of each alloying element to the infiltrant composition to be 2.5 times greater than the desired final content. Chromium does not have a significant impact on the melting point. Thus, its concentration can be kept the same in the skeleton and in the infiltrant. The processing window for the infiltration is over 200° C., and the diffusivities of Ni, Mn, and Cu in iron at 1300° C. are all approximately $10^{-14}$ m$^2$/s, which is slow enough to allow infiltration before freezing. (The liquidus and solidus information presented in Table 2 was calculated using Thermo-Calc, a Computational Thermodynamics program used to perform calculations of thermodynamic properties of multi-component systems based on the Kaufman binary thermodynamic database.)

The infiltrant liquidus temperature dictates the minimum infiltration temperature. In the case of 316 stainless steel, this infiltration temperature (1292° C.) lies below that of the bulk material solidus (1339° C.). This means that the material will undergo complete diffusional solidification at the infiltration temperature and the liquid flow will be choked off in a rime period determined by the solidification rate. If the infiltrant liquidus is above that of the bulk material solidus, as is the case with 17–4PH steel, then the final part composition will lie in a two-phase field and liquid will always be present at the infiltration temperature. These two conditions are analogous to the previous distinction made between skeleton material systems of low and high solubility of MPD.

Figure 17:
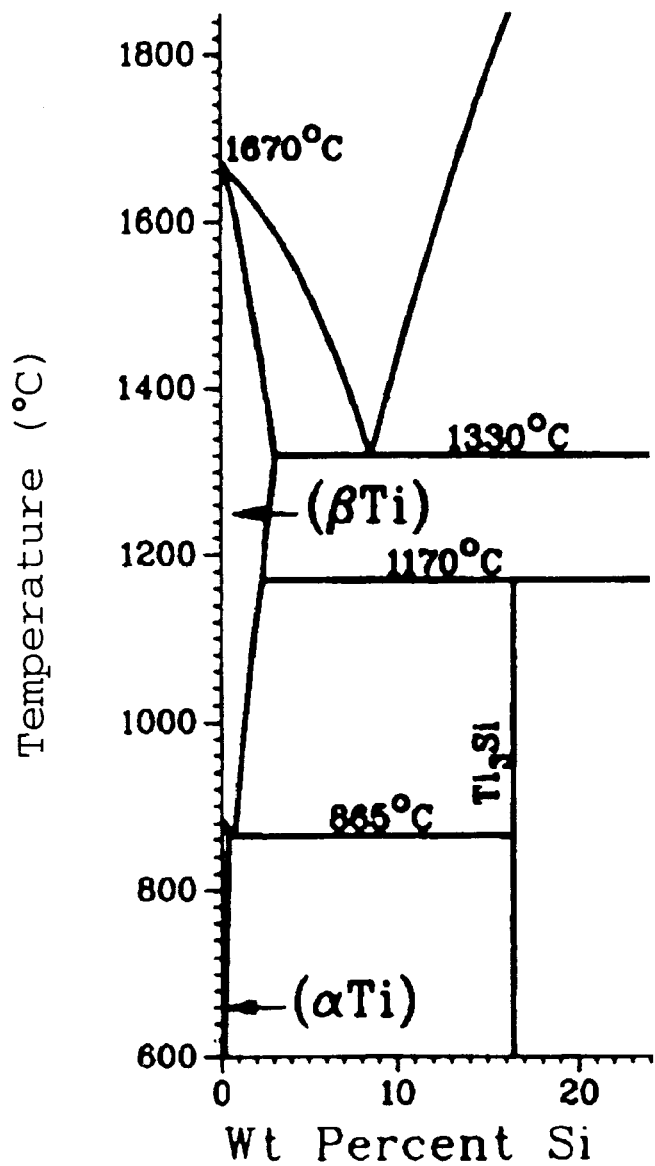
FIG. 17 is a portion of a titanium-silicon equilibrium phase diagram.

Titanium alloys have important uses in high temperature applications where high specific stiffness and strength are required. The binary Ti—Si phase diagram shown in FIG. 17 shows very similar characteristics to the Ni—Si system discussed in detail above. Although the processing of Ti parts is more challenging, the materials behave similarly. Other alloying elements that are common in commercial Ti alloys include but are not limited to Al, Sn, Zr, Mo, V, Cu and Cr. Copper has a fairly significant impact on the melting point, reaching a eutectic temperature of 1005° C. at a composition of 45 wt %. Chromium and zirconium also work as melting point depressants in titanium, although to a lesser degree.

Copper-based material systems are also good candidates for the infiltration of a higher melting temperature skeleton with a similar material used as an infiltrant. Potential melting point depressants chat can be found in cast copper alloys are Ag, Mg, Mn, Si, Sn, and Ti.

Many techniques and aspects of the inventions have been described herein. The person skilled in the art will understand that many of these techniques can be used with other disclosed techniques, even if they have not been described as being used together. Thus, the fact that a subcombination of features that are described separately, may not be described in subcombination, does not mean chat the inventors do not regard any such subcombination as an invention chat is disclosed herein.

For instance, any of the following techniques and features can be used with any of rho others: skeleton with feeder channels; skeleton with a relatively coarse inner powder, with surfaces covered with a paste formed from relatively finer powder; liquid infiltrant supply tabs to introduce liquid to the skeleton at multiple locations; providing the infiltrant supply at a desired liquidus composition to facilitate uniform bulk composition along the path of infiltration; agitating the infiltrant supply to insure that it remains at such a desired composition; using an infiltrant with a melting point depressant that diffuses into the skeleton material, thereby tending to homogenize the composition of the finished part, in some cases (high solubility) completely, and in other cases (lower solubility) to a degree similar to cast products; choosing powder size to insure infiltration to the full extents of the skeleton in consideration of a penetration distance limit imposed due to diffusional solidification, with relatively larger particle sizes allowing greater penetration distance before freezing, and relatively smaller particle sizes having a greater capillary rise limit in the absence of freezing; choosing powder surface area (roughness) to achieve penetration to the desired extent, with relatively rougher surface area particles providing greaser capillary driving force, faster and thus, deeper penetration than relatively smoother surface area particles, other factors being equal; choosing material systems with MPD that will diffuse within the skeleton material to a degree necessary to achieve homogenization of bulk properties, and, if possible, composition, but at a rare that is slow enough to permit full infiltration of the skeleton before diffusional solidification (if any) occurs to a degree sufficient to choke off flow of liquid infiltrant into the skeleton. Any of these general principles and techniques can be applied to any of the material systems disclosed, or hereinafter developed.

Some of the inventions disclosed herein are methods of fabricating metal parts. However, other inventions disclosed herein are methods of designing processes for fabricating such metal parts. In other words, the process design inventions are methods for designing manufacturing processes. For instance, it is disclosed how a designer, challenged with the task of fabricating a metal part of a specified shape, and specified basic metal (e.g., a predominantly nickel part, or a predominantly aluminum part) will proceed to design the process to make the part. The disclosure herein teaches how the designer shall select a powder composition including the base metal and alloying elements, and also how to select an infiltrant, composed of the metal of the powder, and melting point depressant agents. (The skeleton metal can also include some smaller amount of these MPD agents.) The disclosure also teaches chat a relatively small powder size should be first considered if smooth surface finish is desired, and then if such size is too small to permit full infiltration due to penetration distance limits, instead a larger particle size must be selected. The designer is also informed by this disclosure of the effects of particle size, surface roughness, density, viscosity, and myriad other factors that can be considered in rho selection of the materials of rho skeleton and MPD. Additional mechanical techniques are disclosed to overcome, or minimize the effect of material based infiltration penetration limits. These mechanical techniques include but are not limited to: feeder channels, fluid supply tabs, covering a relatively coarse skeleton with a paste of finer particle, and using particles with a rough surface. Thus, the designer is taught how to achieve Infiltration penetration distance greater than would be achieved in a comparison system, without the enhancement, for instance, feeder channels, rougher particle surface, or relatively fine powder surrounding a skeleton of relatively coarser powder.

Further, the disclosure teaches how to achieve various degrees of uniformity in composition, including substantially fully homogeneous, homogeneous along the direction of infiltration, and non-homogeneous, but similar in microstructure to cast products, resulting in essentially homogeneous properties. These teachings are based on maintaining the infiltrant at a liquidus composition, and more subtle selection criteria related to the ratios of components in the infiltrant as diffusional solidification takes place in ternary and higher infiltrant systems, facilitated by resort to equilibrium phase diagrams. All of these tools relate to the inventions of designing a process of fabricating a metal part.

This disclosure describes and discloses more than one invention. The inventions are set forth in the claims of this and related documents, not only as filed, but also as developed during prosecution of any patent application based on this disclosure. The inventors intend to claim the various inventions to the limits permitted by the prior art, as it is subsequently determined to be. No feature described herein is essential to each invention disclosed herein. Thus, the inventors intend that no features described herein, but not claimed in any particular claim of any patent based on this disclosure, should be incorporated into any such claim.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

This is being filed of even date with a Patent Application under the Patent Cooperation Treaty, designating The United States of America, in the names of the same inventors (Sachs, Lorenz and Allen), entitled INFILTRATION OF A NET SHAPE POWDER METAL SKELETON BY A SIMILAR ALLOY WITH MELTING POINT DEPRESSED TO CREATE A HOMOGENEOUS FINAL PART, Attorney Docket No. MIT 8873 PCT, being filed under Ex. Mail Label No. EL662947541US the full disclosure, of which is incorporated fully herein by reference, including the specification, claims and figures.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing The functions in combination with other claimed elements as specifically claimed.

Having described the inventions, what is claimed is:

1. A method for fabricating a substantially metal part, comprising the steps of:
   a. providing a skeleton of interconnected adhered metal powder having a network of interconnected porosities throughout, said metal powder composed of at least two elements;
   b. providing an infiltrant comprising:
      i. the same at least two elements as are in the skeleton; and
      ii. melting point depressant (MPD);
      the infiltrant having a composition that is a liquidus composition for an infiltration temperature; and
   c. infiltrating said skeleton with said infiltrant, said infiltration driven primarily by capillarity at approximately said infiltration temperature.

2. The method of claim 1, further comprising the step of subjecting said infiltrated skeleton to conditions such that at least some of said MPD diffuses from said infiltrated porosities into said metal powder, and diffusional solidification occurs.

3. The method of claim 1, said step of providing infiltrant comprising: providing, in a vessel, an infiltrant supply having a bulk composition within a multi-phase field where at said infiltration temperature solid is present and liquid is present at a liquidus composition, and further comprising the steps of:
   a. melting a portion of said infiltrant supply; and
   b. agitating said melted portion of said infiltrant supply throughout its volume, to a degree that ensures that said liquid remains at said liquidus composition.

4. The method of claim 3, said step of agitating comprising stirring said melted portion of said infiltrant supply.

5. The method of claim 3, said step of agitating comprising bubbling gas through said melted infiltrant supply.

6. The method of claim 3, said step of agitating comprising shaking said melted infiltrant supply.

7. The method of claim 3, said step of agitating comprising applying an electromagnetic inductive field to said melted infiltrant precursor supply.

8. The method of claim 3, said step of agitating comprising tipping said vessel back and forth.

9. The method of claim 2, said step of subjecting said infiltrated skeleton to temperature conditions such that diffusional solidification occurs, comprising subjecting said skeleton to a temperature range that exceeds said infiltration temperature.

10. The method of claim 9, said step of subjecting said infiltrated skeleton to a temperature range that exceeds said infiltration temperature comprising maintaining said infiltrated skeleton at substantially constant temperature, such that solidification occurs substantially isothermally.

11. The method of claim 1, said step of infiltrating said porosities of said skeleton with said melted infiltrant comprising substantially fully filling substantially all of said network of interconnected porosities with said melted infiltrant.

12. The method of claim 2, said step of subjecting said infiltrated skeleton to temperature conditions such that said MPD diffuses comprising subjecting said infiltrated skeleton to temperature conditions such that said MPD diffuses from said infiltrated network of porosities into and substantially throughout said metal powder.

13. The method of claim 1,
   a. wherein said step of providing infiltrant comprises providing, in a vessel, an infiltrant supply, having a bulk composition that is in an equilibrium multiple phase field at said infiltration temperature, such that solid is present and liquid is present at a liquidus composition; and further comprising the step of:
   b. overheating said infiltrant supply to a temperature that exceeds said infiltration temperature and maintaining said overheating such that at least some of said infiltrant that is solid in said multiple phase field becomes liquid.

14. A method for fabricating a substantially metal part, comprising the steps of:
   a. providing a skeleton of interconnected adhered metal powder having a network of interconnected porosities throughout, said metal powder composed of two or more elements, chosen as in step e below;
   b. providing an infiltrant comprising:
      i. the same elements as are in the skeleton; and
      ii. melting point depressant;
      the infiltrant having a composition that is a liquidus composition for an infiltration temperature, the liquidus composition and infiltration temperature chosen as in step e below;
   c. infiltrating said skeleton at said infiltration temperature with said infiltrant in liquid form, said infiltration driven primarily by capillarity;
   d. subjecting said infiltrated skeleton to conditions such that a portion of said melting point depressant diffuses from said infiltrated porosities into said metal powder, and at least partial diffusional solidification occurs; and
   e. choosing said metal powder composition, melting point depressant, infiltrant composition and infiltration temperature such that during diffusional solidification of said infiltrant, relative ratios, of components other than melting point depressant, in said liquid infiltrant not yet solidified, remain constant.

15. The method of claim 14, said melting point depressant consisting essentially of a single element.

16. The method of claim 14, said melting point depressant consisting essentially of two or more elements, all of which have similar mass transport characteristics relative to said elements of said skeleton.

17. The method of claim 14, said step of subjecting said infiltrated skeleton to conditions such that at least partial diffusional solidification occurs comprising subjecting said infiltrated skeleton to constant temperature conditions such that at least partial isothermal solidification occurs.

18. The method of claim 14, said step of subjecting said infiltrated skeleton to conditions such that at least partial diffusional solidification occurs comprising subjecting said infiltrated skeleton to reducing temperature conditions.

19. The method of claim 14, said skeleton further comprising melting point depressant.

20. The method of claim 14, said skeleton being substantially free of melting point depressant.

21. The method of claim 14, said step of choosing comprising choosing said metal powder composition, melting point depressant, infiltrant composition and infiltration temperature such that a liquidus composition and a solidus composition of said infiltrant, that are joined by a tie line on an equilibrium phase diagram, both lie on a line of constant relative proportions of non-MPD components of said infiltrant.

22. The method of claim 21, said step of choosing comprising choosing said metal powder composition, melting point depressant, infiltrant composition and infiltration temperature such that the composition of said skeleton, lies on said line of constant relative proportions of non-MPD components of said infiltrant.

23. A method for fabricating a substantially metal part, comprising the steps of:
   a. providing a skeleton of interconnected adhered metal powder having a network of interconnected porosities throughout, said metal powder comprising a single metal;
   b. providing an infiltrant comprising:
      i. the same metal as is in the skeleton; and
      ii. melting point depressant consisting essentially of a single element;
      the infiltrant having a composition that is the liquidus composition for an infiltration temperature;
   c. infiltrating said skeleton at said infiltration temperature with said infiltrant in liquid form, said infiltration driven primarily by capillarity;
   d. subjecting said infiltrated skeleton to conditions such that a portion of said melting point depressant diffuses from said infiltrated porosities into said metal powder, and at least partial diffusional solidification occurs.

24. The method of claim 23, said step of subjecting said infiltrated skeleton to conditions such that at least partial diffusional solidification occurs comprising subjecting said infiltrated skeleton to constant temperature conditions such that at least partial isothermal solidification occurs.

25. The method of claim 23, said step of subjecting said infiltrated skeleton to conditions such that at least partial diffusional solidification occurs comprising subjecting said infiltrated skeleton to reducing temperature conditions.

26. The method of claim 23, said skeleton further comprising melting point depressant.

27. The method of claim 23, said skeleton being free of melting point depressant.

28. A method for fabricating a substantially metal part, comprising the steps of:
   a. providing a skeleton of interconnected adhered metal powder having a network of interconnected porosities throughout, said powder packed at a packing fraction, said metal powder composed of at least one element, chosen as in step e below;
   b. providing an infiltrant comprising:
      i. the same at least one elements as are in the skeleton; and
      ii. melting point depressant;
      the infiltrant having a composition that is a liquidus composition for an infiltration temperature, the liquidus composition and infiltration temperature chosen as in step e below;
   c. infiltrating said skeleton at said infiltration temperature with said infiltrant in liquid form, said infiltration driven primarily by capillarity;
   d. subjecting said infiltrated skeleton to conditions such that a portion of said melting point depressant diffuses from said infiltrated porosities into said metal powder, and at least partial diffusional solidification occurs; and
   e. choosing skeleton packing fraction, said metal powder composition, melting point depressant, infiltrant composition and infiltration temperature such that after diffusional solidification of said infiltrant at said infiltration temperature ceases, an interconnected network of liquid, remains substantially throughout said skeleton.

29. The method of claim 28, further wherein said interconnected network of liquid is sufficiently porous to permit flow of infiltrant therethrough.

30. The method of claim 28, further comprising the step of subjecting said infiltrated skeleton to lower temperature conditions such that all of said infiltrant solidifies such that said infiltrated skeleton achieves a bulk composition substantially identical to that of a casting of said infiltrant.

31. A method for fabricating a substantially metal part, comprising the steps of:
 a. providing a skeleton of interconnected adhered metal powder having a network of interconnected porosities throughout a geometry, said metal powder composed of at least one element, chosen as in step e below, with powder particle composition and characteristics chosen as in step e below;
 b. providing an infiltrant comprising:
  i. the same elements as are in the skeleton; and
  ii. melting point depressant;
  the infiltrant having a composition, chosen as in step e below;
 c. infiltrating said skeleton at an infiltration temperature chosen as in step e below, with said infiltrant in liquid form, said infiltration driven primarily by capillarity;
 d. subjecting said infiltrated skeleton to conditions such that after said step of infiltration has substantially completed such that said skeleton geometry is fully infiltrated, a portion of said melting point depressant diffuses from said infiltrated porosities into said metal powder, and at least partial diffusional solidification occurs; and
 e. choosing said metal powder composition, melting point depressant, infiltrant composition and infiltration temperature and metal particle size, size distribution, and surface roughness, such that said infiltrant infiltrates throughout substantially all of said network of interconnected porosities before essentially any of said diffusional solidification has occurred;
 whereby said infiltrated skeleton is substantially free of compositional gradient along a direction of infiltration.

32. The method of claim 31, said step of choosing, in the case of infiltrating without opposing gravity, comprising choosing a representative size of said powder material, and, then if the resultant rate of infiltration is too slow to infiltrate substantially all of said network before any diffusional solidification occurs, choosing a relatively larger representative size of powder particle to increase the rate of infiltration.

33. The method of claim 31, said step of choosing, in the case of infiltrating against gravity, comprising choosing a representative size of said powder material, and, then if the resultant rate of infiltration is too slow to infiltrate substantially all of said skeleton before any diffusional solidification occurs, choosing a relatively larger representative size of powder particle to increase the rate of infiltration, but limiting the choice of relatively larger size particles to a particles small enough to achieve a capillary driving force to overcome gravity to the full height of said geometry.

34. The method of claim 31, said step of choosing, in the case of infiltrating against gravity, having an acceleration g, in a skeleton having a geometry with height h, comprising choosing:
 said powder to have a surface area $S_p$ of the pore space in the skeleton and a volume $V_p$ of the pore space in the skeleton;
 said infiltrant to have a liquid density $\rho$, and liquid/vapor interfacial energy $\gamma_{LV}$ and a contact angle $\theta$ with the solid of the skeleton powder, such that:

$$\frac{\gamma_{LV}\cos(\theta)S_p}{V_p} > \rho gh.$$

35. The method of claim 34, said step of choosing, further comprising choosing substantially mono-modal spherical particles, and choosing said skeleton to have a void fraction $\epsilon$ and said spherical particles to having a diameter D, such that:

$$\frac{\gamma_{LV}\cos(\theta)6(1-\varepsilon)}{D\varepsilon} > \rho gh.$$

36. A method for fabricating a substantially metal part, comprising the steps of:
 a. providing a skeleton of interconnected adhered metal powder having a network of interconnected porosities throughout a geometry, said metal powder composed of at least one element, chosen as in step e below, with powder particle composition and characteristics chosen as in step e below;
 b. providing an infiltrant comprising:
  i. the same elements as are in the skeleton; and
  ii. melting point depressant;
  the infiltrant having a composition chosen as in step e below;
 c. infiltrating said skeleton at an infiltration temperature, chosen as in step e below, with said infiltrant in liquid form, said infiltration driven primarily by capillarity;
 d. subjecting said infiltrated skeleton to conditions such that after said step of infiltration has been substantially completed such that said skeleton geometry is fully infiltrated, a portion of said melting point depressant diffuses from said infiltrated porosities into said metal powder, and diffusional solidification occurs to an extent that blocks off flow of infiltrant throughout said interconnected porosities; and
 e. choosing said metal powder composition, said melting point depressant, said infiltrant composition said infiltration temperature, said metal particle size, and metal particle size distribution, and surface roughness, such that said infiltrant infiltrates throughout substantially all of said network of interconnected porosities before diffusional solidification occurs to an extent that blocks off flow of infiltrant throughout said interconnected porosities.

37. A method for infiltrating a substantially metal part, comprising the steps of:
 a. providing a skeleton having:
  i. an interconnected adhered metal powder body having a network of interconnected porosities throughout, said porosities having a characteristic pore size;
  ii. at least one infiltrant contact surface; and
  iii. at least one feeder channel having a characteristic diameter d that is at least three times said pore size, said feeder channel extending from said infiltrant contact surface to a first internal region of said network of porosities;
 b. providing, an infiltrant supply, said infiltrant comprising:
  i. the same elements as are in the skeleton; and
  ii. melting point depressant;
 c. subjecting said infiltrant supply to an infiltration temperature under conditions that melt at least a portion of said infiltrant supply;

d. contacting said infiltrant contact surface of said skeleton to said melted infiltrant supply, such that liquid infiltrant passes through said feeder channel to said internal region;

e. subjecting said skeleton to conditions such that said liquid infiltrant is driven primarily by capillarity and infiltrates said interconnected porosities of said skeleton, including said internal region;

f. subjecting said infiltrated skeleton to temperature conditions such that a portion of said melting point depressant diffuses from said infiltrated porosities into said metal powder; and g. subjecting said infiltrated skeleton to temperature conditions such that infiltrant that has infiltrated said porosities, solidifies.

38. The method of claim 37, said network of porosities having a diffusional solidification related penetration distance limit (PL), said skeleton having a geometry and dimension such that a second internal region of said network of interconnected porosities is;

a. spaced from said infiltrant contact surface a distance that exceeds said penetration distance limit; and b. spaced from said feeder channel a distance that is less than said penetration distance limit;

whereby said infiltrant infiltrates said skeleton to said second internal region through said feeder channel, beyond said penetration distance limit from said infiltrant contact surface.

39. The method of claim 37, said feeder channel having a diameter of at least five times said characteristic pore size.

40. The method of claim 37, said skeleton having a geometry and dimension from said infiltrant contact surface, such that infiltrant must travel to a height h above said infiltrant contact surface to reach said second internal region of said network of porosities, said feeder channel having a radius r that is less than:

$$\frac{2\gamma\cos(\theta)}{\rho g h},$$

where $\rho$ is the density of said liquid infiltrant, g is acceleration due to gravity, $\gamma_{LV}$ is the liquid/vapor interfacial energy, and $\theta$ is the contact angle of the liquid with the solid.

41. The method of claim 38, said skeleton having a geometry and dimension from said infiltrant contact surface, such that infiltrant must travel to a height z above said infiltrant contact surface to reach said second internal region of said network of porosities, said feeder channel having a radius r that is less than:

$$\frac{2\gamma\cos(\theta)}{\rho g (z - PL)},$$

where $\rho$ is the density of said liquid infiltrant, g is acceleration due to gravity, $\gamma_{LV}$ is the liquid/vapor interfacial energy, and $\theta$ is the contact angle of the liquid with the solid.

42. The method of claim 37, said feeder channel comprising a channel having a characteristic diameter of between five and ten times said characteristic pore size.

43. The method of claim 37, said skeleton comprising a feeder channel having at least two portions, inclined relative to each other.

44. The method of claim 37, said feeder channel having a characteristic diameter that varies along its length.

45. The method of claim 37, said at least one feeder channel comprising a network of feeder channels.

46. A method for infiltrating a substantially metal part, comprising the steps of:

a. providing a skeleton of interconnected adhered metal first powder having a surface and a network of interconnected porosities throughout, said powder having a relatively larger characteristic particle size;

b. substantially covering said surface of said skeleton with a covering layer comprising relatively fine metallic powder, said relatively fine powder having a characteristic size that is significantly smaller than said relatively larger characteristic size;

c. providing, in a vessel, an infiltrant supply, said infiltrant comprising:
  i. the same elements as are in the first powder of said skeleton; and
  ii. melting point depressant;

d. subjecting said infiltrant supply to an infiltration temperature, under conditions that melt a portion of said infiltrant supply;

e. contacting said skeleton to said melted infiltrant supply, such that infiltrant is drawn into said skeleton through said relatively larger metal powder, driven primarily by capillary action;

f. infiltrating said interconnected porosities of said relatively larger metal powder with said melted infiltrant and infiltrating said covering layer with said melted infiltrant, via said interconnected porosities of said relatively larger metal powder;

g. subjecting said infiltrated skeleton to temperature conditions such that a portion of said melting point depressant diffuses from said infiltrated porosities into said relatively larger metal powder; and h. subjecting said infiltrated skeleton to temperature conditions such that infiltrant that has infiltrated said porosities, solidifies.

47. The method of claim 46, further, wherein an interconnected network of porosities within a body of interconnected adhered said fine powder has a diffusional solidification related penetration distance limit, said skeleton having a geometry and dimension such that:

a. a region of said fine covering layer is spaced from said infiltrant contact surface a distance that exceeds said penetration distance limit; and b. said covering layer has a thickness that is less than said penetration distance limit;

whereby said infiltrant infiltrates said fine covering layer through said interconnected porosities of said relatively larger metal powder, beyond said penetration distance limit from said infiltrant contact surface.

48. The method of claim 46, said covering layer comprising relatively fine metallic powder having particle sizes that are between approximately 1/10 and approximately 1/100 said relatively larger characteristic particle size.

49. The method of claim 46, said step of applying a covering layer comprising applying said layer to said surface of said skeleton to create a skin of finer powder over said relatively larger metal particles at said surface.

50. The method of claim 46, said step of applying a covering layer comprising applying said covering layer to said surface of said skeleton so that said covering layer penetrates into porosities between said relatively larger metal powder, leaving particles of said relatively larger metal powder at said surface with, at most, a thin covering layer of said finer powder.

51. The method of claim 46, wherein:
  a. said covering layer comprises a paste having a polymeric vehicle; and
  b. further comprising the step of subjecting said paste covered skeleton to temperature conditions such that said polymeric vehicle burns off and is substantially eliminated from said paste and said relatively fine powder particles are sintered into place.

52. A method for infiltrating a substantially metal part, comprising the steps of:
  a. providing a skeleton of interconnected adhered metal powder having a network of interconnected porosities throughout, said powder particles having:
    i. a size and shape such that, if smooth, said particles would have a nominal surface area; and
    ii. a surface texture that gives rise to an actual surface area that exceeds said nominal surface area by between approximately 25% and 500% of said nominal surface area;
  b. providing, an infiltrant supply comprising:
    i. the same elements as are in the skeleton; and
    ii. melting point depressant;
  c. subjecting said infiltrant supply to an infiltration temperature, under conditions that melt at least a portion of said infiltrant supply;
  d. contacting said skeleton to said melted infiltrant supply, such that liquid infiltrant is drawn into said skeleton through said network of porosities, driven primarily by capillary action;
  e. infiltrating said interconnected porosities of said skeleton with said melted infiltrant.
  f. subjecting said infiltrated skeleton to temperature conditions such that a portion of said melting point depressant diffuses from said infiltrated porosities into said metal powder; and
  g. subjecting said infiltrated skeleton to temperature conditions such that infiltrant that has infiltrated said porosities, solidifies;
  wherein a comparison network of porosities identical to said network, but for having a representative particle surface area equal to said nominal surface area, having a diffusional solidification related penetration distance limit (PL), said skeleton having a geometry and dimension such that a region of said network of interconnected porosities is spaced from said infiltrant contact surface a distance that exceeds said penetration distance limit of said comparison network;
  whereby said infiltrant infiltrates said skeleton to said region of said network by capillarity through said interconnected porosities of particles having a surface area that exceeds said smooth surface area, beyond said penetration distance limit, from said infiltrant contact surface.

53. The method of claim 52, said skeleton of powder particles comprising hydrometallurgically processed powder.

54. The method of claim 52, said powder particles comprising vapor phase etched powder.

55. The method of claim 52, said powder particles comprising the relatively large powder particles that are each coated with a layer of powder particles that are smaller than said relatively large particles, said smaller particles having a size between 1/1000 and 1/10 the size of said relatively large particles.

56. A method for infiltrating a substantially metal part, comprising the steps of:
  a. providing a skeleton having:
    i. an interconnected adhered metal powder body having a network of interconnected porosities throughout;
    ii. at least two infiltrant contact surfaces; and
    iii. for each infiltrant contact surface, at least one infiltrant supply tab coupled to said respective infiltrant contact surface;
  b. providing, an infiltrant supply comprising:
    i. the same elements as are in the skeleton; and
    ii. melting point depressant;
  c. subjecting said infiltrant supply to an infiltration temperature under conditions that melt at least a portion of said infiltrant supply;
  d. coupling each of said infiltrant supply tabs to said melted portion of said infiltrant supply, such that liquid infiltrant passes through said supply tab to said respective infiltrant contact surface;
  e. subjecting said skeleton to conditions such that said liquid infiltrant infiltrates said interconnected porosities of said skeleton, including regions adjacent said infiltrant contact surfaces, said infiltration driven primarily by capillarity;
  f. subjecting said infiltrated skeleton to temperature conditions such that a portion of said melting point depressant diffuses from said infiltrated porosities into said metal powder; and
  g. subjecting said infiltrated skeleton to temperature conditions such that infiltrant that has infiltrated said porosities, solidifies.

57. The method of claim 56, said fluid supply tabs comprising hollow tubes.

58. The method of claim 56, said fluid supply tabs comprising tubes that are integral with said skeleton.

59. A method for fabricating a substantially metal part, comprising the steps of:
  a. providing a skeleton of interconnected adhered metal powder having a network of interconnected porosities throughout, said metal powder composed of iron;
  b. providing an infiltrant comprising:
    i. the same elements as are in the skeleton; and
    ii. melting point depressant (MPD) comprising an alloy of iron, carbon, manganese, silicon, chromium, nickel and molybdenum;
  c. infiltrating said interconnected porosities with said infiltrant in liquid form, said infiltration driven primarily by capillarity;
  d. subjecting said infiltrated skeleton to temperature conditions such that said melting point depressant diffuses from said infiltrated voids into said metal powder; and
  e. subjecting said infiltrated skeleton to temperature conditions such that infiltrant that has infiltrated into said interconnected porosities, solidifies.

60. A method for fabricating a substantially metal part, comprising the steps of:
  a. providing a skeleton of interconnected adhered metal powder having a network of interconnected porosities throughout, said metal powder composed of iron;
  b. providing an infiltrant comprising:
    i. the same elements as are in the skeleton; and
    ii. melting point depressant (MPD) comprising an alloy of iron, carbon, manganese, silicon, chromium, nickel, copper and niobium;

c. infiltrating said interconnected porosities with said infiltrant in liquid form, said infiltration driven primarily by capillarity;

d. subjecting said infiltrated skeleton to temperature conditions such that said melting point depressant diffuses from said infiltrated voids into said metal powder; and e. subjecting said infiltrated skeleton to temperature conditions such that infiltrant that has infiltrated into said interconnected porosities, solidifies.

61. A method for fabricating a substantially metal part, comprising the steps of:

a. providing a skeleton of interconnected adhered metal powder having a network of interconnected porosities throughout, said metal powder comprising titanium;

b. providing an infiltrant comprising:
   i. the same elements as are in the skeleton; and
   ii. melting point depressant (MPD) comprising silicon;

c. infiltrating said interconnected porosities with said infiltrant in liquid form, said infiltration driven primarily by capillarity;

d. subjecting said infiltrated skeleton to temperature conditions such that said silicon diffuses from said infiltrated voids into said metal powder; and e. subjecting said infiltrated skeleton to temperature conditions such that infiltrant that has infiltrated into said interconnected porosities, solidifies.

62. A method for fabricating a substantially metal part, comprising the steps of:

a. providing a skeleton of interconnected adhered metal powder having a network of interconnected porosities throughout, said metal powder comprising titanium;

b. providing an infiltrant comprising:
   i. the same elements as are in the skeleton; and
   ii. melting point depressant (MPD) comprising at least one material selected from the group consisting of: aluminum, tin, zirconium, molybdenum, vanadium, copper and chromium;

c. infiltrating said interconnected porosities with said infiltrant in liquid form, said infiltration driven primarily by capillarity;

d. subjecting said infiltrated skeleton to temperature conditions such that said melting point depressant diffuses from said infiltrated voids into said metal powder; and e. subjecting said infiltrated skeleton to temperature conditions such that infiltrant that has infiltrated into said interconnected porosities, solidifies.

63. The method of claim 14, further comprising choosing said metal powder composition, such that relative ratios, of components other than melting point depressant, are equal to said relative ratios, of components other than melting point depressant, in said infiltrant.

* * * * *